United States Patent
Yu et al.

(10) Patent No.: US 11,902,915 B2
(45) Date of Patent: Feb. 13, 2024

(54) COMMUNICATION METHOD AND COMMUNICATIONS APPARATUS

(71) Applicant: HUAWEI TECHNOLOGIES CO., LTD., Guangdong (CN)

(72) Inventors: Haifeng Yu, Beijing (CN); Yiling Wu, Beijing (CN); Yuchen Wang, Shenzhen (CN); Zhenyu Li, Beijing (CN); Chenwan Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 200 days.

(21) Appl. No.: 17/360,276

(22) Filed: Jun. 28, 2021

(65) Prior Publication Data

US 2021/0329571 A1 Oct. 21, 2021

Related U.S. Application Data

(63) Continuation of application No. PCT/CN2018/125115, filed on Dec. 28, 2018.

(51) Int. Cl.
*H04W 52/36* (2009.01)
*H04W 48/20* (2009.01)
*H04W 52/14* (2009.01)
*H04W 74/08* (2009.01)

(52) U.S. Cl.
CPC ......... *H04W 52/367* (2013.01); *H04W 48/20* (2013.01); *H04W 52/146* (2013.01); *H04W 74/0833* (2013.01)

(58) Field of Classification Search
CPC . H04W 52/367; H04W 48/20; H04W 52/146; H04W 74/0833
See application file for complete search history.

(56) References Cited

U.S. PATENT DOCUMENTS

| | | | |
|---|---|---|---|
| 2015/0327133 A1* | 11/2015 | Yiu | H04W 36/00837 455/436 |
| 2017/0013598 A1* | 1/2017 | Jung | H04W 76/14 |
| 2020/0037238 A1* | 1/2020 | Sundberg | H04W 48/20 |

FOREIGN PATENT DOCUMENTS

| | | |
|---|---|---|
| CN | 104904280 A | 9/2015 |
| CN | 105744573 A | 7/2016 |
| CN | 108964794 A | 12/2018 |
| WO | 2018060832 A1 | 4/2018 |

(Continued)

OTHER PUBLICATIONS

Partial Supplementary European Search Report issued in European Application No. 18945047.1 dated Nov. 4, 2021, 16 pages.

(Continued)

*Primary Examiner* — John J Lee
(74) *Attorney, Agent, or Firm* — Fish & Richardson P.C.

(57) ABSTRACT

This present disclosure discloses example communication methods and communications apparatuses. One example communication method includes a terminal device determining a first offset of a first power class and a second offset of the first power class when a power class of the terminal device is the first power class. A compensation amount of the first power class is determined based on the first offset and the second offset. A determination as to whether to camp on a first cell is made based on the second offset and the compensation amount of the first power class.

15 Claims, 6 Drawing Sheets

(56) References Cited

FOREIGN PATENT DOCUMENTS

WO    2018084626 A1    5/2018
WO    2018144936 A1    8/2018

OTHER PUBLICATIONS

3GPP TS 36.101 V15.4.0 (Sep. 2018), "3rd Generation Partnership Project; Technical Specification Group Radio Access Network; Evolved Universal Terrestrial Radio Access (E-UTRA); User Equipment (UE) radio transmission and reception(Release 15)," Sep. 2018, 1698 pages.
Ericsson (email rapporteur), "Email report [97bis#34][eNB-IoT] CE authorisation," 3GPP TSG-RAN2 Meeting #98, R2-1705033, Hangzhou, China, May 15-19, 2017, 5 pages.
PCT International Search Report and Written Opinion issued in International Application No. PCT/CN2018/125115 dated Sep. 18, 2019, 17 pages (with English translation).
Huawei, HiSilicon, "Lower UE power class for Rel-15 MTC," 3GPP TSG RAN WG2 Meeting #101, R2-1802190, Resubmission of R2-1713121, Athens, Greece, Feb. 26-Mar. 2, 2018, 5 pages.
Office Action issued in Chinese Application No. 201880100441.5 dated Nov. 22, 2021, 12 pages (with English translation).

\* cited by examiner

COMMUNICATION METHOD AND COMMUNICATIONS APPARATUS

CROSS-REFERENCE TO RELATED APPLICATIONS

This application is a continuation of International Application No. PCT/CN2018/125115, filed on Dec. 28, 2018, the disclosure of which is hereby incorporated by reference in its entirety.

TECHNICAL FIELD

This application relates to the communications field, and more specifically, to a communications method and apparatus in the communications field.

BACKGROUND

In an existing long term evolution (LTE) system and a narrow band-internet of things (NB-IoT) system, a plurality of transmit power classes of terminal devices exist on some operating bands. Specifically, in the LTE system, there are two power classes on a band 41: a power class of 26 dBm (Power Class 2) and a power class of 23 dBm (Power Class 3), and there are two power classes on a band 3: a power class of 31 dBm (Power Class 1) and a power class of 23 dBm (Power Class 3). In the NB-IoT system, two power classes: a power class of 23 dBm (Power Class 3) and a power class of 14 dBm (Power Class 6) are supported on a plurality of bands. It can be learned that the existing LTE and NB-IoT systems are systems of terminals with a plurality of power classes. However, the existing LTE and NB-IoT systems do not support a power class of 33 dBm.

An enterprise LTE discrete spectrum aggregation (eLTE-DSA) 230 system (which may also be referred to as a 230 system) works on a 230 MHz spectrum of the electric power industry. eLTE-DSA is also a system of terminals with a plurality of power classes, but different from the LTE system or the NB-IoT system, the eLTE-DSA introduces a new power class requirement to increase uplink coverage. To be specific, the eLTE-DSA needs to support a terminal maximum transmit power of 33 dBm.

Protocols of the existing LTE and NB-IoT systems are designed only for a terminal device with 23 dBm. To be specific, processing of a terminal device with 23 dBm is not distinguished from processing of a terminal device with 33 dBm. Therefore, in the eLTE-DSA system, a communication method supporting a terminal device with a power class of 33 dBm is urgently required, so that the terminal device with 33 dBm has a high-power sending advantage over the terminal device with 23 dBm.

SUMMARY

This application provides a communication method and a communications apparatus that can support a terminal device with a power class of 33 dBm, so that the terminal device with 33 dBm has a high-power sending advantage over a terminal device with 23 dBm.

According to a first aspect, a communication method is provided, where the communication method is used for cell selection, and the method includes:

When a power class of a terminal device is a first power class, the terminal device determines a first offset of the first power class and a second offset of the first power class;

the terminal device determines a compensation amount of the first power class based on the first offset and the second offset; and the terminal device determines, based on the second offset and the compensation amount of the first power class, whether to camp on a first cell.

Therefore, in this embodiment of this application, different power classes are distinguished in a cell selection calculation process. To be specific, when the terminal device has a first transmit power class, the terminal device determines the compensation amount of the first power class based on the first offset and the second offset of the first power class, and further performs cell selection based on the second offset and the compensation amount of the first power class. In this embodiment of this application, an appropriate compensation amount of the first power class may be obtained by setting values of the first offset and the second offset, so that the terminal device with the first power class more easily satisfies a criterion used for cell selection, and further more easily accesses a cell.

With reference to the first aspect, in some implementations of the first aspect, that the terminal device determines a compensation amount of the first power class based on the first offset and the second offset includes:

The terminal device determines the compensation amount of the first power class based on the following formula (1):

$$P_{compensation} = \max(P_{EMAX} - \min(P_{EMAX} + P_{offset}, P_{powerclass}) - Q_{offsettemp}, 0)(dB) \quad (1), \text{where}$$

$P_{compensation}$ in the formula (1) represents the compensation amount of the first power class, $P_{EMAX}$ is a maximum transmit power of the terminal device allowed by the first cell, $P_{offset}$ represents the first offset, $Q_{offsettemp}$ represents the second offset, and $P_{powerclass}$ is a maximum radio frequency output power that corresponds to the first power class and that is of the terminal device.

With reference to the first aspect, in some implementations of the first aspect, the method further includes:

When the power class of the terminal device is a second power class, the terminal device determines a compensation amount of the second power class; and the terminal device determines, based on the compensation amount of the second power class, whether to camp on the first cell.

With reference to the first aspect, in some implementations of the first aspect, that the terminal device determines a compensation amount of the second power class includes:

The terminal device determines the compensation amount $P_{compensation}$ of the second power class based on the following formula (2):

$$P_{compensation} = \max(P_{EMAX} - P_{powerclass}, 0)(dB) \quad (2), \text{where}$$

$P_{compensation}$ in the formula (2) represents the compensation amount of the second power class, $P_{EMAX}$ is the maximum transmit power of the terminal device allowed by the first cell, and $P_{powerclass}$ is a maximum radio frequency output power that corresponds to the second power class and that is of the terminal device.

With reference to the first aspect, in some implementations of the first aspect, that the terminal device determines a first offset of the first power class and a second offset of the first power class includes:

The terminal device receives a system message, where the system message includes the first offset and the second offset.

In this way, a network device can flexibly configure the first offset and the second offset. In other words, a temporary offset and a compensation amount between the terminal device with the first power class and the terminal device with the second power class may be adjusted by flexibly configuring the first offset and the second offset by the network device.

With reference to the first aspect, in some implementations of the first aspect, the first power class is a power class of 33 dBm. The second power class is a power class of 23 dBm.

With reference to the first aspect, in some implementations of the first aspect, a value of the first offset is 0 dB, 2 dB, 4 dB, 6 dB, 8 dB, 10 dB, 12 dB, or 15 dB, and a value of the second offset is −7, −6, −5, −4, −3, −2, −1, or 0.

Therefore, in this embodiment of this application, the terminal device with a power class of 33 dBm has a larger uplink/downlink access range than the terminal device with a power class of 23 dBm. Therefore, in this embodiment of this application, the terminal device with 33 dBm located on an edge can be enabled to more easily satisfy an S criterion, and further more easily accesses a cell.

According to a second aspect, a communication method is provided, where the communication method is used for uplink power control, and the method includes:

When a terminal device determines that a power class is a first power class, the terminal device determines a first offset of the first power class;

the terminal device determines a first terminal transmit power corresponding to the first power class based on the first offset; and the terminal device determines a terminal uplink transmit power corresponding to the first power class based on the first terminal transmit power.

Therefore, in this embodiment of this application, different power classes are distinguished in an uplink power control process. To be specific, when the terminal device has a first transmit power class, the terminal device determines the first terminal transmit power corresponding to the first power class based on the first offset of the first power class, and further determines the terminal uplink transmit power corresponding to the first power class based on the first terminal transmit power. In this embodiment of this application, an appropriate first terminal transmit power ($P_{CMAX,c}$) may be obtained by setting a value of the first offset of the first power class, so that the terminal device with the first power class more easily exerts a high-power advantage, to achieve an effect of coverage blind compensation.

With reference to the second aspect, in some implementations of the second aspect, that the terminal device determines a first terminal transmit power corresponding to the first power class based on the first offset includes:

The terminal device determines the first terminal transmit power based on the following formula (3):

$$P_{CMAX,c} = \text{Min}(P_{max} + P_{offset}, P_{powerclass}) \quad (3), \text{ where}$$

$P_{CMAX,c}$ in the formula (3) represents the first terminal transmit power, $P_{max}$ is a maximum transmit power of the terminal device allowed by a serving cell, $P_{offset}$ represents the first offset, and $P_{powerclass}$ is a maximum radio frequency output power that corresponds to the first power class and that is of the terminal device.

With reference to the second aspect, in some implementations of the second aspect, the method further includes:

When the terminal device determines that the power class is a second power class, the terminal device determines a second terminal transmit power corresponding to the second power class; and the terminal device determines a terminal uplink transmit power corresponding to the second power class based on the second terminal transmit power.

With reference to the second aspect, in some implementations of the second aspect, that the terminal device determines a second terminal transmit power corresponding to the second power class includes:

The terminal device determines the second terminal transmit power based on the following formula (4):

$$P_{CMAX,c} = \text{Min}(P_{max}, P_{powerclass}) \quad (4), \text{ where}$$

$P_{CMAX,c}$ in the formula (4) represents the second terminal transmit power, $P_{max}$ is the maximum transmit power of the terminal device allowed by the serving cell, and $P_{powerclass}$ is a maximum output power that corresponds to the second power class and that is of the terminal device.

With reference to the second aspect, in some implementations of the second aspect, that the terminal device determines a first offset of the first power class includes:

The terminal device receives a system message, where the system message includes the first offset.

In this way, a network device can flexibly configure the first offset. In other words, a transmit power difference between the terminal device with the first power class and the terminal device with the second power class may be adjusted by flexibly configuring the first offset by the network device, making it convenient for the network device to control, to achieve an effect of coverage blind compensation.

With reference to the second aspect, in some implementations of the second aspect, the first power class is a power class of 33 dBm. The second power class is a power class of 23 dBm.

With reference to the second aspect, in some implementations of the second aspect, a value of the first offset is 0 dB, 2 dB, 4 dB, 6 dB, 8 dB, 10 dB, 12 dB, or 15 dB.

Therefore, in this embodiment of this application, the terminal device with a power class of 33 dBm can always exert a high-power advantage of itself, to achieve an effect of blind compensation. Further, in this embodiment of this application, a new calculation formula of $P_{cmax,c}$ is designed, so that regardless of a value of $P_{max}$, the high-power terminal (namely, the terminal with 33 dBm) can always have a sending advantage over the low-power terminal (the terminal with 23 dBm).

According to a third aspect, a communication method is provided, where the communication method is used for random access, and the method includes:

When a power class of a terminal device is a first power class, the terminal device determines a first offset of the first power class:

the terminal device determines a preamble initial target received power and/or ramping step corresponding to the first power class based on the first offset; and the terminal device performs random access based on the preamble initial target received power and/or ramping step corresponding to the first power class.

Therefore, in this embodiment of this application, different power classes are distinguished in a random access process. To be specific, when the terminal device has a first transmit power class, the terminal device determines the preamble initial target received power and/or ramping step corresponding to the first power class based on the first offset of the first power class, and further performs random access based on the preamble initial target received power and/or ramping step. In this embodiment of this application, an appropriate preamble initial target received power and/or ramping step may be obtained by setting a value of the first offset of the first power class, so that the terminal device with the first power class more easily reaches a maximum transmit power, and further more easily performs random access.

With reference to the third aspect, in some implementations of the third aspect, that the terminal device determines a preamble initial target received power and/or ramping step corresponding to the first power class based on the first offset includes:

The terminal device adds the first offset to an initialized preamble initial target received power, to obtain the preamble initial target received power corresponding to the first power class; and/or the terminal device adds the first offset to an initialized ramping step, to obtain the ramping step corresponding to the first power class.

With reference to the third aspect, in some implementations of the third aspect, that the terminal device determines a first offset of the first power class includes:

The terminal device receives a system message, where the system message includes the first offset.

In this way, a network device can flexibly configure the first offset. In other words, a difference between powers at which an Msg1 is sent of the terminal device with the first power class and the terminal device with the second power class may be adjusted by flexibly configuring the first offset by the network device, making it convenient for the network device to control the first power class, to increase a probability of a random access success.

With reference to the third aspect, in some implementations of the third aspect, the first power class is a power class of 33 dBm. The second power class is a power class of 23 dBm.

With reference to the third aspect, in some implementations of the third aspect, a value of the first offset is 0 dB, 2 dB, 4 dB, 6 dB, 8 dB, 10 dB, 12 dB, or 15 dB.

According to a fourth aspect, a communications apparatus is provided, and is configured to perform the methods in the first aspect to the third aspect or any possible implementation of the first aspect to the third aspect. Specifically, the communications apparatus includes units configured to perform the methods in the first aspect to the third aspect or any possible implementation of the first aspect to the third aspect.

According to a fifth aspect, a communications apparatus is provided. The communications apparatus includes a transceiver, a processor, and a bus system. Optionally, the communications apparatus may further include a memory. The transceiver, the memory, and the processor are connected to each other by using the bus system. The memory is configured to store instructions. The processor is configured to execute the instructions stored in the memory, to control the transceiver to receive and/or send signals, and when the processor executes the instructions stored in the memory, the execution enables the processor to perform the methods in the first aspect to the third aspect or any possible implementation of the first aspect to the third aspect.

According to a sixth aspect, a computer-readable medium is provided, and is configured to store computer programs. The computer programs include instructions used for performing the methods in any possible implementation of the first aspect to the third aspect.

According to a seventh aspect, a computer program product is provided, including computer program code. When run by a communications unit, a processing unit, a transceiver, or a processor of a communications device, the computer program code enables a beam training apparatus to perform the methods in any possible implementation of the first aspect to the third aspect.

DESCRIPTION OF EMBODIMENTS

The following describes technical solutions of this application with reference to accompanying drawings.

The technical solutions of the embodiments of this application may be applied to various power class communications systems, such as: a global system for mobile communication (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunication system (UMTS), a worldwide interoperability for microwave access (WiMAX) communications system, a future 5th generation (5G) system, or a new radio (NR) system.

Figure 1:
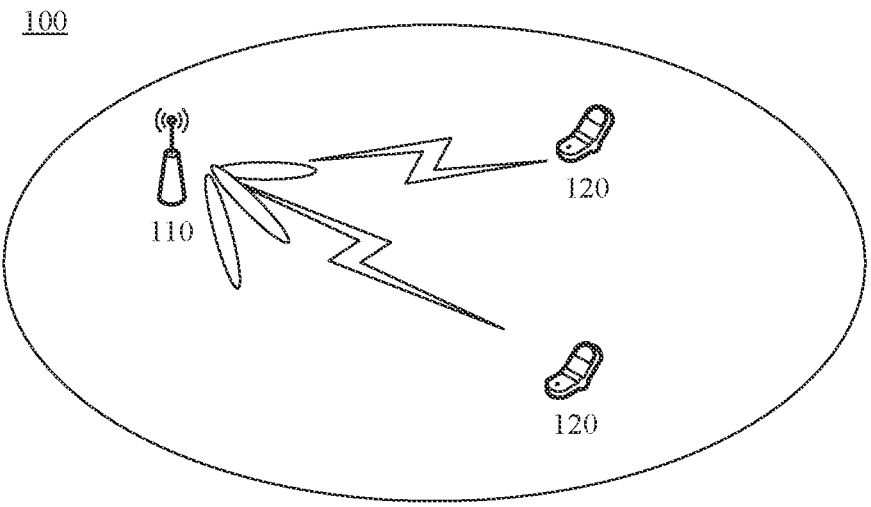
FIG. 1 is a schematic diagram of a communications system to which embodiments of this application are applicable.

FIG. 1 is a schematic diagram of a communications system 100 to which a communications method and apparatus of the embodiments of this application are applicable. As shown in the figure, the communications system 100 may include at least one network device, for example, a network device 110 shown in FIG. 1. The communications system 100 may further include at least one terminal device, for example, a terminal device 120 shown in FIG. 1. The network device 110 may communicate with the terminal device 120 by using a wireless link.

Each communications device, such as the network device 110 or the terminal device 120 in FIG. 1 may be configured with a plurality of antennas. The plurality of antennas may include at least one transmit antenna configured to send a signal and at least one receive antenna configured to receive a signal. In addition, each communications device further additionally includes a transmitter chain and a receiver chain. A person of ordinary skill in the art may understand that both the transmitter chain and the receiver chain may include a plurality of components related to signal sending and receiving (for example, a processor, a modulator, a multiplexer, a demodulator, a demultiplexer, or an antenna). Therefore, the network device and the terminal device may communicate with each other by using a multi-antenna technology.

It should be understood that the network device in the wireless communications system may be any device with a wireless transceiver function. The device includes but is not limited to: an evolved NodeB (eNB), a radio network controller (RNC), a NodeB (NB), a base station controller (BSC), a base transceiver station (BTS), a home base station (for example, a Home evolved NodeB, or a Home Node B (HNB)), a baseband unit (BBU), an access point (AP) in a wireless fidelity (WIFI) system, a wireless relay node, a wireless backhaul node, a transmission point (TP), a transmission and reception point (TRP), or the like. The device may alternatively be a gNB or a transmission point (TRP or TP) in a 5G system, for example, an NR system or one or a group of antenna panels (including a plurality of antenna panels) of a base station in the 5G system, or the device may alternatively be a network node that constitutes a gNB or a transmission point, for example, a baseband unit (BBU) or a distributed unit (DU).

In some deployments, the gNB may include a centralized unit (CU) and a DU. The gNB may further include a remote unit (RU). The CU implements some functions of the gNB, and the DU implements some functions of the gNB. For example, the CU implements functions of radio resource control (RRC) and a packet data convergence protocol (PDCP) layer. The DU implements functions of a radio link control (RLC) layer, a media access control (MAC) layer, and a physical (PHY) layer. Because information of the RRC layer eventually becomes information of the PHY layer, or is transformed from the information of the PHY layer, in this architecture, higher layer signaling, such as RRC layer signaling, may also be considered to be sent by the DU, or sent by the DU+CU. It may be understood that the network device may be a CU node, a DU node, or a device including a CU node and a DU node. In addition, the CU may be classified into a network device in an access network (RAN), or the CU may be classified into a network device in a core network (CN). This is not limited in this application.

It should be further understood that the terminal device in the wireless communications system may also be referred to as user equipment (UE), an access terminal, a subscriber unit, a subscriber station, a mobile station, a mobile station, a remote station, a remote terminal, a mobile device, a user terminal, a terminal, a wireless communications device, a user agent, or a user apparatus. The terminal device in the embodiments of this application may be a mobile phone, a pad, a computer with a wireless transceiver function, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. An application scenario is not limited in the embodiments of this application.

After being powered to be switched on, the terminal device first completes a process of PLMN selection. After completing the PLMN selection, the terminal device enters a cell selection process. To be specific, the terminal device selects, based on a cell selection criterion, an appropriate cell for camping. In an implementation, the cell selection criterion is an S criterion. Specifically, a determining principle of the S criterion is: If $S_{qual}>0$ and $S_{rxlev}>0$, the terminal device camps on the cell, where $$S_{rxlev} = Q_{rxlmeas} - (Q_{rxlevmin} + Q_{rxlevminoffset}) - P_{compensation} - Q_{offsettemp}$$

$$S_{qual} = Q_{qualmeas} - (Q_{qualmin} + Q_{qualminoffst}) - Q_{offsettemp}.$$

If a cell priority is not considered, the S criterion for cell selection may be simplified as:

$$S_{rxlev} = Q_{rxlevmeas} - Q_{rxlevmin} - P_{compensation} - Q_{offsettemp}$$

$$S_{qual} = Q_{qualmeas} - Q_{qualmin} - Q_{offsettemp}.$$

$Q_{offsetemp}$ is a temporary offset value, and the value may be configured by the network device. Particularly, when T300 expires and cell selection/reselection is to be performed, regardless of the value of $Q_{offsettemp}$ configured by the network device, the value of $Q_{offsettemp}$ is set to be infinite.

$P_{compensation}$ is a compensation amount. In an LTE system, if there is an NS-PmaxList configuration in a system information block (SIB), where the SIB herein, for example, is an SIB1, an SIB3, or an SiB5, and there is additional Pmax in NS-PmaxList, $$P_{compensation} = \max(P_{EMAX1} - P_{PowerClass}, 0) - (\min(P_{EMAX2}, P_{PowerClass}) - \min(P_{EMAX1}, P_{PowerClass}))$$
(dB), where $P_{EMAX1}$ is $P_{Max}$, a maximum transmit power of the terminal device allowed by a cell, and is used in a cell uplink signal transmission process, and has a unit of dBm. $P_{EMAX2}$ is a value corresponding to additional Pmax.

In an NB-IoT system, if $P_{PowerClass}$ is 14 dBm, $$P_{compensation} = \max(P_{EMAX1} - (P_{PowerClass} - P_{offset}), 0)$$
(dB);

if $P_{PowerClass}$ is not 14 dBm,
$\max(P_{EMAX1} - P_{PowerClass}, 0)$(dB)

In addition, other parameters related in the S criterion are shown in the following Table 1:

TABLE 1

| | |
|---|---|
| $S_{rxlev}$ | Cell selection received level value (dB) |
| $S_{qual}$ | Cell selection received quality value (dB) |
| $Q_{rxlevmeas}$ | Received signal level value of a to-be-camped cell, namely, RSRP, unit: dBm; |
| $Q_{qualmeas}$ | Received signal quality value of a to-be-camped cell, namely, RSRQ |
| $Q_{rxlevmin}$ | Cell minimum received level value configured in the network device, unit: dBm |
| $Q_{qualmin}$ | Cell minimum received quality value configured in the network device, unit: dBm |
| $Q_{rxlevminoffset}$ | Offset of the cell minimum received signal level, where this parameter is used only when the terminal device tries a cell of a higher-priority PLMN; to be specific, when the terminal device camps on a cell of a VPLMN, the terminal device performs cell selection decision based on the parameter left to the terminal device by the cell of the higher-priority PLMN, |
| $Q_{qualminoffset}$ | Offset of the cell minimum received signal quality, where this parameter is used only when the terminal device tries a cell of a higher-priority PLMN; to be specific, when the terminal device camps on a cell of a |

TABLE 1-continued

| | |
|---|---|
| | VPLMN, the terminal device performs cell selection decision based on the parameter left to the terminal device by the cell of the higher-priority PLMN. |
| $P_{EMAX1}$, $P_{EMAX2}$ | $P_{EMAX1}$ is PMax, configured by the network device through broadcasting. $P_{EMAX2}$ is additionalPmax, configured by the network device through broadcasting. |
| $P_{PowerClass}$ | Terminal device maximum transmit power corresponding to a transmit class; refer to TS 36.101 for definition of a power class of the terminal device. |

However, in the foregoing mechanism for cell selection, power classes of 23 dBm and 33 dBm are not distinguished in a calculation process of the S criterion. For a communications system supporting a terminal maximum transmit power of 33 dBm (for example, an eLTE-DSA system), in a scenario in which 23 dBm and 33 dBm are mixed, if cell selection is performed in the foregoing manner, a terminal device with 33 dBm located on an edge cannot access a cell. In view of this, the embodiments of this application provide a communication method. In the communication method, a power class of 23 dBm and a power class of 33 dBm can be distinguished in the calculation process of the S criterion, so that the terminal device with 33 dBm located on the edge more easily satisfies the S criterion, and further more easily accesses a cell.

The following describes in detail the embodiments of this application with reference to the accompanying drawings.

It should be understood that, in the embodiments shown below, the first, the second, the third, and various numeric numbers are merely distinguishing for ease of description, and are not intended to limit the scope of the embodiments of this application. For example, different power classes, different offsets, and different transmit powers are distinguished.

It should be further understood that, in the embodiments shown below, "pre-obtaining" may include indicating by network device signaling or predefining, for example, defining by a protocol. "Predefining" may be implemented by pre-storing corresponding code and tables in a device (for example, including a terminal device and a network device) or in other manners that may be used for indicating related information. A specific implementation of predefining is not limited in this application.

It should be further understood that "storage" in the embodiments of this application may mean storage in one or more memories. The one or more memories may be separately disposed, or may be integrated into an encoder or a decoder, a processor, or a communications apparatus. Alternatively, some of the one or more memories may be separately disposed, and some may be integrated into a decoder, a processor, or a communications apparatus. A type of the memory may be a storage medium in any form. This is not limited in this application.

It should be further understood that the "protocol" in the embodiments of this application may be a standard protocol in the communications field, for example, may include an LTE protocol, an NR protocol, and a related protocol applied to a future communications system. This is not limited in this application.

The technical solutions in this application may be applied to a wireless communications system, for example, the communications system 100 shown in FIG. 1. There may be a wireless communication connection relationship between two communications apparatuses in the wireless communications system. For example, one of the two communications apparatuses may correspond to the network device 110 shown in FIG. 1, for example, may be the network device 110 or a chip configured in the network device 110, and for example, the other of the two communications apparatuses may correspond to the terminal device 120 in FIG. 1, for example, may be the terminal device 120 or a chip configured in the terminal device 120.

Without loss of generality, the following describes in detail the embodiments of this application first by using a communication process of a terminal device as an example. It may be understood that any terminal device in the wireless communications system or a chip configured in the terminal device may perform communication based on a same method. This is not limited in this application.

Figure 2:
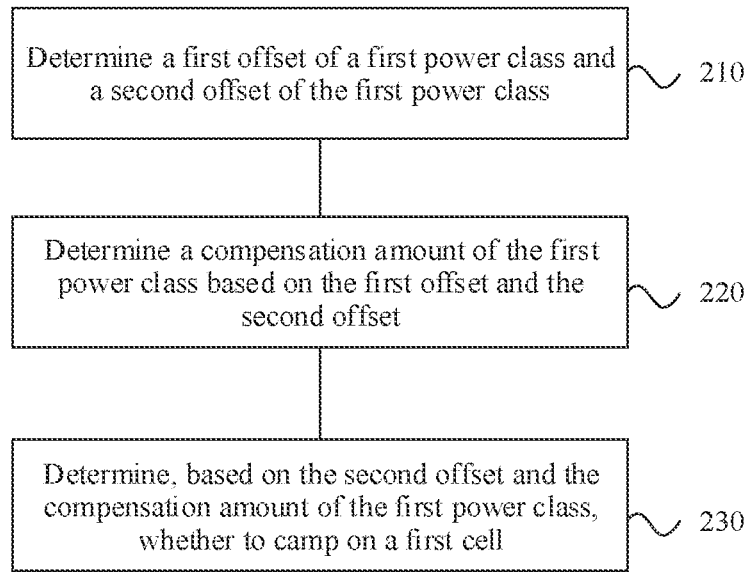
FIG. 2 is a schematic flowchart of a communication method according to an embodiment of this application.

FIG. 2 is a schematic flowchart of a communication method according to an embodiment of this application. The method is used for cell selection, and specifically, is used for determining whether to camp on a first cell. In this embodiment of this application, the method is performed by a terminal device. Herein, the terminal device supports one or more cell transmit power classes, for example, including a power class of 33 dBm and a power class of 23 dBm. This is not specifically limited in this embodiment of this application.

Specifically, the method shown in FIG. 2 includes 210 to 230.

210. When a power class of the terminal device is a first power class, the terminal device determines a first offset of the first power class and a second offset of the first power class.

Specifically, when the terminal device having a plurality of transmit power classes performs cell selection, the terminal device may determine a power class to be used for uplink transmission, for example, the first power class or a second power class. For example, for an eLTE-DSA 230 system, the terminal device may determine that the terminal device uses a maximum transmit power of 33 dBm (namely, a class of 33 dBm), or a maximum transmit power of 23 dBm (namely, a class of 23 dBm), or another maximum transmit power after being switched on. Therefore, compared with a current technology, in this embodiment of this application, during cell selection, different power classes can be distinguished. For example, the power class of 23 dBm and the power class of 33 dBm can be distinguished.

In this embodiment of this application, the first power class is higher than the second power class. To be specific, a transmit power value of the terminal device with the first power class is greater than a transmit power value of the terminal device with the second power class. By way of example rather than limitation, the first power class may be the power class of 33 dBm, and the second power class may be the power class of 23 dBm. The following provides description by using an example in which the first power class is 33 dBm and the second power class is 23 dBm. However, this does not limit the solution of this embodiment of this application.

In this embodiment of this application, when determining that the power class of the terminal device is the first power class, the terminal device determines the first offset of the first power class and the second offset of the first power class. Specifically, the second offset may be set based on receiver sensitivity of the terminal device.

Optionally, in this embodiment of this application, a value of the first offset may be 0 dB, 2 dB, 4 dB, 6 dB, 8 dB, 10 dB, 12 dB, or 15 dB, or another value. This is not limited in this embodiment of this application.

Optionally, in this embodiment of this application, a value of the second offset may be −7, −6, −5, −4, −3, −2, −1, or 0, or another value. This is not limited in this embodiment of this application.

Optionally, in this embodiment of this application, the terminal device may receive a system message sent by a network device, where the system message includes the first offset and the second offset. Then, the terminal device may determine the first offset and the second offset of the first power class based on the system message. In this way, the network device can flexibly configure the first offset and the second offset. In other words, a temporary offset and a compensation amount between the terminal device with a power class of 33 dBm and the terminal device with a power class of 23 dBm may be adjusted by flexibly configuring the first offset and the second offset by the network device.

Specifically, for example, the system message may be a broadcast message, for example, a primary system message block (MIB), or an SIB, or another system message. For example, the SIB may be an SIB1, an SIB2, an SIB3, . . . , an SIBX, or the like. This is not limited in this embodiment of this application. X is a positive integer.

Alternatively, in this embodiment of this application, in the terminal device, the first offset and the second offset may be pre-stipulated in a protocol. The terminal device may determine the first offset and the second offset based on the protocol stipulation. This is not limited in this embodiment of this application.

220. The terminal device determines a compensation amount of the first power class based on the first offset and the second offset.

In a specific implementation, the terminal device may determine the compensation amount of the first power class based on the following formula (1):

$$P_{compensation} = \max(P_{EMAX} - \min(P_{EMAX} + P_{offset}, P_{powerclass}) - Q_{offsettemp}, 0)(dB) \quad (1), \text{where}$$

$P_{compensation}$ in the foregoing formula represents the compensation amount of the first power class, $P_{EMAX}$ is a maximum transmit power of the terminal device allowed by the first cell, $P_{offset}$ represents the first offset, $Q_{offsettemp}$ represents the second offset, namely, a receiver sensitivity temporary offset of the first power class, and $P_{powerclass}$ is a maximum transmit power that corresponds to the first power class and that is of the terminal device.

230. The terminal device determines, based on the second offset and the compensation amount of the first power class, whether to camp on the first cell.

Specifically, the terminal device may substitute the receiver sensitivity temporary offset of the first power class and the compensation amount of the first power class into a calculation formula of an S criterion, and determine, based on calculated values of $S_{qual}$ and $S_{relev}$, whether to camp on the first cell. Specifically, if $S_{qual} > 0$ and/or $S_{relev} > 0$, the S criterion for cell selection is satisfied, and the terminal device camps on the first cell.

Therefore, in this embodiment of this application, different power classes are distinguished in a cell selection calculation process. To be specific, when the terminal device has a first transmit power class, the terminal device determines the compensation amount of the first power class based on the first offset and the second offset of the first power class, and further performs cell selection based on the second offset and the compensation amount of the first power class. In this embodiment of this application, an appropriate compensation amount of the first power class may be obtained by setting values of the first offset and the second offset, so that the terminal device with the first power class more easily satisfies a criterion used for cell selection, and further more easily accesses a cell.

Optionally, in this embodiment of this application, when the power class of the terminal device is the second power class, the terminal device determines a compensation amount of the second power class, and then the terminal device determines, based on the compensation amount of the second power class, whether to camp on the first cell.

Optionally, the terminal device may further determine a temporary offset of the second power class. In a possible implementation, the temporary offset of the second power class is 0. In this case, the compensation amount $P_{compensation}$ of the second power class may be obtained as follows:

$$P_{compensation} = \max(P_{EMAX} - P_{powerclass}, 0)(dB) \quad (2), \text{where}$$

$P_{compensation}$ in the formula (2) represents the compensation amount of the second power class, $P_{EMAX}$ is the maximum transmit power of the terminal device allowed by the first cell, and $P_{powerclass}$ is a maximum transmit power that corresponds to the second power class and that is of the terminal device.

Figure 3:
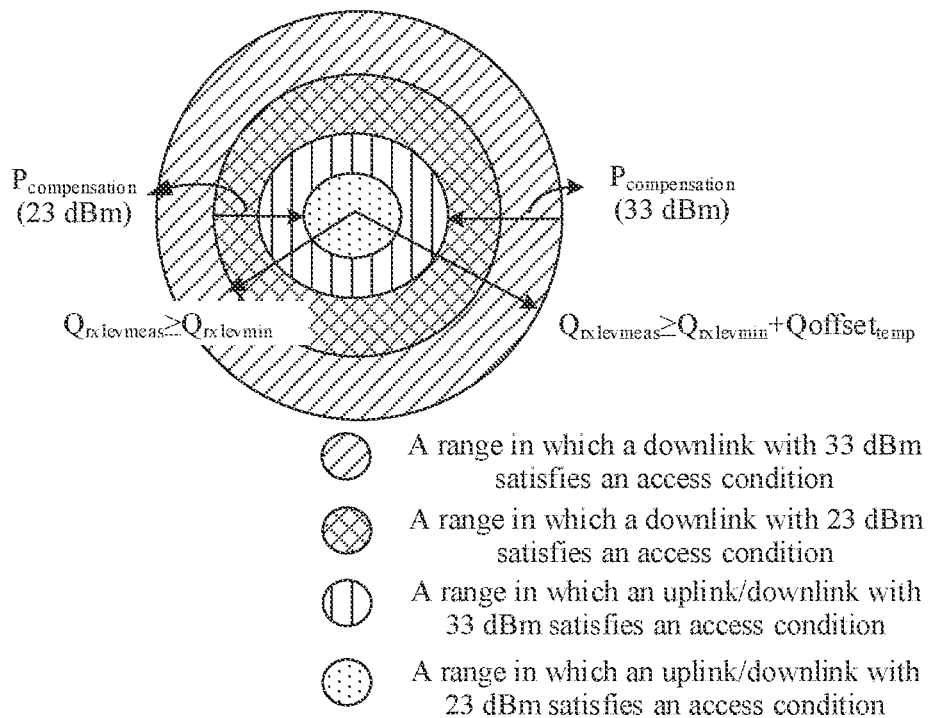
FIG. 3 shows a range in which an uplink/downlink with a power class of 33 dBm and an uplink/downlink with a power class of 23 dBm satisfy an access condition according to an embodiment of this application.

FIG. 3 shows a range in which an uplink/downlink with a power class of 33 dBm and an uplink/downlink with a power class of 23 dBm satisfy an access condition according to an embodiment of this application. It can be learned from FIG. 3 that, when a downlink with 33 dBm of a terminal device satisfies an access condition, $Q_{rxlevmeas} \geq Q_{rxlevmin} + Q_{offsettemp}$ is satisfied; and when a downlink with 23 dBm of the terminal device satisfies an access condition, $Q_{rxlevmeas} \geq Q_{rxlevmin}$ is satisfied. In addition, a range in which the downlink with 33 dBm of the terminal device satisfies the access condition is greater than a range in which the downlink with 23 dBm of the terminal device satisfies the access condition.

In addition, a range in which an uplink with 33 dBm of the terminal device satisfies an access condition is less than the range in which the downlink with 33 dBm satisfies the access condition, and a difference between the range in which the uplink with 33 dBm of the terminal device satisfies the access condition and the range in which the downlink with 33 dBm satisfies the access condition is a compensation value corresponding to the power class of 33 dBm. A range in which an uplink with 23 dBm of the terminal device satisfies an access condition is less than the range in which the downlink with 23 dBm satisfies the access condition, and a difference between the range in which the uplink with 23 dBm of the terminal device satisfies the access condition and the range in which the downlink with 23 dBm satisfies the access condition is a compensation value corresponding to the power class of 23 dBm.

Obviously, according to a method for cell selection according to the embodiments of this application, the range in which the uplink corresponding to the power class of 33 dBm of the terminal device satisfies the access condition is greater than the range in which the uplink corresponding to the power class of 23 satisfies the access condition. Therefore, in the embodiments of this application, the terminal device with a power class of 33 dBm has a larger uplink/downlink access range than the terminal device with a power class of 23 dBm. Therefore, in the embodiments of this application, the terminal device with 33 dBm located on an edge can be enabled to more easily satisfy an S criterion, and further more easily accesses a cell.

During uplink data transmission, the terminal device needs to perform power control. The following separately describes power control from aspects such as definition, classification, power control formulas, and calculation of $P_{cmax, c}$.

Definition

Power control is to change a transmit power of a terminal device or a network device (such as a base station) in a wireless manner within a specific range, to compensate for a pathloss and shadow fading of a channel, suppress interference between intra-frequency cells in a communications system, and ensure network coverage and capacity requirements, and communication quality.

Classification:

Based on a data transmission direction, power control may be classified into uplink power control and downlink power control. Based on a control mode, power control may be classified into open-loop power control and closed-loop power control. Power control in the embodiments of this application is mainly for uplink open-loop power control. Specifically, the terminal device evaluates a pathloss and an interference level based on a measurement result, and then calculates a preamble initial received target power by using a formula.

Power Control Formulas:

In different cases, uplink power calculation formulas corresponding to uplink power control are different. The embodiments of this application include but not limited to the following uplink power control calculation process. The following provides description by using a formula (a) and a formula (b) as examples.

If the terminal device transmits a physical uplink shared channel (PUSCH) on a frame i of a serving cell c, and does not transmit a physical uplink control channel (PUCCH) at the same time, a PUSCH transmit power $P_{PUSCH,c}(i)$ on a subframe i is provided by the formula (a):

$$P_{PUSCH,c}(i) = \min \begin{Bmatrix} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix}, \text{where} \quad (a)$$

a unit of $P_{PUSCH,c}$ in the formula (a) is dBm.

If the terminal device is on the frame i of the serving cell c, when the terminal device simultaneously transmits the PUSCH and the PUCCH, the transmit power $P_{PUSCH,c}(i)$ used for transmitting the PUSCH by the terminal device is provided by the formula (b):

$$P_{PUSCH,c}(i) = \min \begin{Bmatrix} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix}$$

(b), where a unit of $P_{PUSCH,c}$ in the formula (b) is dBm.

If the terminal device receives, on the serving cell c, a transmit power control (TPC) command for the PUSCH in a DCI format 3/3A, the PUSCH transmit power $P_{PUSCH,c}(i)$ on the subframe i is provided by a formula (c):

$$P_{PUSCH,c}(i) = \min\{P_{CMAX,c}(i), P_{O\_PUSCH,c}(1) + \alpha_c(1) \cdot PL_c + f_c(i)\} \quad (c), \text{where}$$

a unit of $P_{PUSCH,c}$ in the formula (c) is dBm.

$P_{CMAX,c}(i)$ is a transmit power that is of the terminal device on the frame i of the serving cell c and that is configured by a corresponding higher layer.

$M_{PUSCH,c}(i)$ is a quantity of carriers allocated to the PUSCH.

$M_{PUCCH,c}(i)$ is a quantity of carriers allocated to the PUCCH.

$P_{O\_Uplink,c}(j)$ is a parameter formed by a sum of $P_{O\_NOMINAL\_Uplink,c}(j)$ and $P_{O\_UE\_Uplink,c}(j)$ that are both provided by the higher layer in the serving cell c and when j=1, where j∈{1,2}. When dynamic scheduling grant based or scheduling grant free PUSCH or PUCCH transmission (including retransmission) is performed, j=1. When random access response grant based PUSCH or PUCCH transmission (including retransmission) is performed, j=2. In this case, $P_{O\_UE\_Uplink,c}(2)=0$. In addition, $$P_{O\_NOMINAL\_Uplink,c}(2) = P_{O\_PRE} + \Delta PREAMBL\_Msg3,$$
where $\Delta PREAMBL\_Msg3$ is indicated by the higher layer of the serving cell c.

$\alpha_c$ (j): for j=1, in the PUCCH and a physical random access control channel (PRACH) used for a contention-free scheduling request (CFSR), $\alpha_c(j)=1$; and in the PUSCH, $\alpha_c(j)$ is provided by the higher layer of the serving cell c. For j=2, $\alpha_c(j)=1$.

$PL_c$ is a downlink pathloss evaluated and calculated by the terminal device in the serving cell c, and has a unit of dB. If the higher layer configures layer 3 filtering, $PL_c$=crs-Power−RSRP of higher layer filtering, where crs-Power is provided by the higher layer; and otherwise, $PL_c$=crs-Power−RSRP, where crs-Power is provided by the higher layer.

$f_c(i)$ is currently used for PUSCH transmission or PUCCH transmission on the frame i of the serving cell c. If the terminal device receives a transmit power control (TPC) command, and a DL-SCH transport block corresponding to the command ends at a frame number (i−1), $f_c(i)=\delta_{Uplink,c}(i-1)$, where $\delta_{Uplink,c}$ is a corrected value, and is carried by a TPC command media access control (MAC) control element of the serving cell c. See Table 2 for a mapping relationship between $\delta_{Uplink,c}$ and a TPC command field indicated in the TPC command MAC control element. Otherwise, if a value of $P_{O\_UE\_Uplink,c}$ of the serving cell c is changed by the higher layer, $f_c(i)$ is reset to $f_c(0)$, and $f_c(0)=0$. Except the foregoing case, $f_c(i)=f_c(i-1)$.

TABLE 2

| TPC command field in the TPC command MAC control element | $\delta_{Uplink,c}$ [dB] |
|---|---|
| 0 | −16 |
| 1 | −15 |
| 2 | −14 |
| 3 | −13 |
| 4 | −12 |
| 5 | −11 |
| 6 | −10 |
| 7 | −9 |
| 8 | −8 |
| 9 | −7 |
| 10 | −6 |
| 11 | −5 |
| 12 | −4 |
| 13 | −3 |
| 14 | −2 |
| 15 | 1 |
| 16 | 0 |

TABLE 2-continued

| TPC command field in the TPC command MAC control element | $\delta_{Uplink,c}$ [dB] |
|---|---|
| 17 | 1 |
| 18 | 2 |
| 19 | 3 |
| 20 | 4 |
| 21 | 5 |
| 22 | 6 |
| 23 | 7 |
| 24 | 8 |
| 25 | 9 |
| 26 | 10 |
| 27 | 11 |
| 28 | 12 |
| 29 | 13 |
| 30 | 14 |
| 31 | 15 |

For uplink power control, uplink transmit power formulas may further include:

Configuration of a terminal device transmit power for the physical uplink shared channel (PUSCH), or the physical uplink control channel (PUCCH), or the physical random access channel (PRACH) used for a contention-free scheduling request is defined as follows: On the frame i of the serving cell c, when the terminal device does not simultaneously transmit the PUSCH and the PUCCH, the transmit power $P_{Uplink,c}(i)$ of the terminal device for PUSCH transmission, or PUCCH transmission, or transmission of the PRACH used for a CFSR is provided by a formula (d).

On the frame i of the serving cell c, when the terminal device simultaneously transmits the PUSCH and the PUCCH, or simultaneously transmits the PUSCH and the PRACH used for a CFSR, the transmit power $P_{PUSCH}(i)$ used for transmitting the PUSCH by the terminal device is provided by a formula (e).

On the frame i of the serving cell c, when the terminal device simultaneously transmits the PUSCH and the PUCCH, or simultaneously transmits the PUSCH and the PRACH used for a CFSR, or simultaneously transmits the PUCCH and the PRACH used for a CFSR, the transmit power $P_{PUCCH/PRACH}(i)$ used for transmitting the PUCCH and the PRACH by the terminal device is provided by a formula (f).

If the terminal device does not transmit the PUSCH, the PUCCH, or the PRACH used for a CFSR on the frame i of the serving cell c, the terminal device assumes that the transmit power $P_{Uplink,c}(i)$ used for PUSCH transmission, or PUCCH transmission, or transmission of the PRACH used for a CFSR is provided by a formula (g).

$$P_{Uplink,c}(i) = \min \begin{Bmatrix} P_{CMAX,c}(i) \\ 10\log10(M_{Uplink,c}(i)) + P_{O_{Uplink},c}(j) + \\ \alpha_c(j) \times PL_c + f_c(i) \end{Bmatrix} [dBm] \quad (d)$$

$$P_{PUSCH}(i) = \min \begin{Bmatrix} P_{CMAX,c}(i) + 10\log10(M_{PUSCH,c}(i) / \\ (M_{PUSCH,c}(i) + M_{PUCCH/PRACH,c}(i))) \\ 10\log10(M_{PUSCH,c}(i)) + \\ P_{O_{Uplink},c}(j) + \alpha_c(j) \times PL_c + f_c(i) \end{Bmatrix} [dBm] \quad (e)$$

$$P_{PUCCH/PRACH}(i) = \min \begin{Bmatrix} P_{CMAX,c}(i) + 10\log10(M_{PUCCH/PRACH,c}(i) / \\ M_{other,c}(i) + M_{PUCCH/PRACH,c}(i))) \\ 10\log10(M_{PUCCH/PRACH,c}(i)) + \\ P_{O_{Uplink},c}(j) + \alpha_c(j) \times PL_c + f_c(i) \end{Bmatrix} [dBm] \quad (f)$$

$$P_{Uplink,c}(i) = \min\{P_{CMAX,c}(i), P_{O_{Uplink},c}(j) + \alpha_c(j) \times PL_c + f_c(i)\}[dBm] \quad (g)$$

In the Formulas:

$P_{CMAX,c}(i)$ is the transmit power that is of the terminal device on the frame i of the serving cell c and that is configured by the corresponding higher layer.

$M_{Uplink,c}(i)$: if the terminal device sends only the PUSCH on the frame i of the serving cell c, $M_{Uplink,c}(i)$ is the quantity of carriers allocated to the PUSCH, $P_{PUSCH}(i)=P_{Uplink,c}(i)$; if the terminal device sends only the PUCCH on the frame i of the serving cell c, $M_{Uplink,c}(i)$ is the quantity of carriers allocated to the PUCCH, $P_{PUCCH}(i)=P_{Uplink,c}(i)$; and if the terminal device sends the PRACH used for a CFSR on the frame i of the serving cell c, $M_{Uplink,c}(i)=1$, $P_{PARCH}(i)=P_{Uplink,c}(i)$.

$M_{PUSCH,c}(i)$ is the quantity of carriers allocated to the PUSCH, and should satisfy requirements of Article 11.2.4.6.2.

$M_{PUCCH/PRACH,c}(i)$: when $P_{PUCCH/PRACH}(i)$ is used for calculating the transmit power of the PUCCH, the value is the quantity of carriers allocated to the PUCCH; and otherwise, the value is a quantity of carriers allocated to the PRACH used for a CFSR.

$M_{other,c}(i)$: when the terminal device simultaneously transmits the PUSCH and the PUCCH, or simultaneously transmits the PUSCH and the PRACH used for a CFSR, the value is the quantity of carriers allocated to the PUSCH; and when the terminal device simultaneously transmits the PUCCH and the PRACH used for a CFSR, if $P_{PUCCH/PRACH}(i)$ is used for calculating the transmit power of the PUCCH, the value is the quantity of carriers allocated to the PRACH used for a CFSR; and if $P_{PUCCH/PRACH}(i)$ is used for calculating the transmit power of the PRACH, the value is the quantity of carriers allocated to the PUCCH.

$P_{O_{Uplink},c}(\ )$ is a parameter formed by a sum of $P_{O\_NOMINAL\_Uplink,c}(j)$ and $P_{O\_UE\_Uplink,c}(j)$ that are both provided by the higher layer in the serving cell c and when j=1, where j∈{1,2}. When dynamic scheduling grant based or scheduling grant free PUSCH or PUCCH transmission (including retransmission) or transmission of the PRACH used for a CFSR is performed, j=1. When random access response grant based PUSCH or PUCCH transmission (including retransmission) is performed, j=2. In this case, $P_{O\_UE\_Uplink,c}(2)=0$, and $P_{O\_NOMINAL\_Uplink,c}(2)=P_{O\_PRE}+\Delta_{PREAMBL\_Msg3}$. Parameters preambleInitialReceivedTargetPower (namely, $P_{O\_PRE}$) and $\Delta_{PREAMBL\_Msg3}$ are indicated by the higher layer of the serving cell c.

$\alpha_c(j)$: for j=1, in the PUCCH and the PRACH used for a CFSR, $\alpha_c(j)=1$; and in the PUSCH, $\alpha_c(j)$ is provided by the higher layer of the serving cell c. For j=2, $\alpha_c(j)=1$.

$PL_c$ is the downlink pathloss evaluated and calculated by the terminal device in the serving cell c, and has a unit of dB. If the higher layer configures layer 3 filtering, $PL_c$=crs-Power−RSRP of higher layer filtering, where crs-Power is provided by the higher layer, and the higher layer filtering should satisfy requirements of Article 11.6.5.3.2; and otherwise, PLc=crs-Power−RSRP, where crs-Power is provided by the higher layer.

$f_c(i)$ is a transmit power adjustment amount currently used for PUSCH transmission, or PUCCH transmission, or transmission of the PRACH used for a CFSR on the frame i of the serving cell c. If the terminal device receives a transmit power control (TPC) command, and the DL-SCH transport block corresponding to the command ends at the frame number (I−1), $f_c(i)=\delta_{Uplink,c}(i-1)$, where $\delta_{Uplink,c}$ is a corrected value, and is carried by the TPC command MAC control element of the serving cell c. See Table 3 for the mapping relationship between $\delta_{Uplink,c}$ and the TPC command field indicated in the TPC command MAC control element. Otherwise, if the value of $P_{O\_UE\_Uplink,c}$ of the serving cell c is changed by the higher layer, $f_c(i)$ is reset to $f_c(0)$, and $f_c(0)=0$. Except the foregoing, case, $f_c(i)=f_c(i-1)$.

TABLE 3

| TPC command field in the TPC command MAC control element | $\delta_{Uplink,c}$ [dB] |
|---|---|
| 0 | −16 |
| 1 | −15 |
| 2 | −14 |
| 3 | −13 |
| 4 | −12 |
| 5 | −11 |
| 6 | −10 |
| 7 | −9 |
| 8 | −8 |
| 9 | −7 |
| 10 | −6 |
| 11 | −5 |
| 12 | −4 |
| 13 | −3 |
| 14 | −2 |
| 15 | 1 |
| 16 | 0 |
| 17 | 1 |
| 18 | 2 |
| 19 | 3 |
| 20 | 4 |
| 21 | 5 |
| 22 | 6 |
| 23 | 7 |
| 24 | 8 |
| 25 | 9 |
| 26 | 10 |
| 27 | 11 |
| 28 | 12 |
| 29 | 13 |
| 30 | 14 |
| 31 | 15 |

Calculation of $P_{cmax,c}$:

It should be noted in that, in the embodiments of this application, calculation of $P_{cmax}$ in power control is mainly optimized. A serving cell allows a terminal device to set a maximum transmit power of the terminal device to $P_{cmax,c}$. Specification stipulates that a value of $P_{cmax,c}$ is between $P_{CMAX\_L,c}$ and $_{CMAX\_H,c}$. However, actually, when setting $P_{cmax,c}$, the terminal device usually sets $P_{CMAX,c}$ to $P_{CMAX\_H,c}$. In the following, $P_{cmax,c}$ is $P_{CMAX\_H,c}$.

In NB-IoT, calculation of $P_{cmax,c}$ is as follows:

$$P_{cmax,c} = \text{Min}(P_{max}, P_{powerclass})$$

In LTE, calculation of $P_{cmax,c}$ is as follows:

$$P_{cmax,c} = \begin{cases} P_{max} \leq 23\ dBm, \text{ or an uplink-downlink configuration is 0/6} \\ \text{Min}(P_{max}, P_{powerclass} - \Delta P_{powerclass}) \quad P_{max} > 23\ dBm, \text{ where} \\ \text{Min}(P_{max}, P_{powerclass}) \end{cases}$$

It can be learned from the foregoing calculation formulas of $P_{cmax,c}$ that, when $P_{max} \leq 23$ dBm, $P_{cmax,c}$ of the terminal device with 33 dBm is the same as $P_{cmax,c}$ of the terminal device with 23 dBm, and only when Pmax>23 dBm, the terminal device with 33 dBm has a transmit advantage over the terminal device with 23 dBm. For a communications system (such as an eLTE-DSA system) supporting a 230 MHz spectrum, the terminal device with a power class of 33 dBm needs to be always capable of exerting a high-power advantage of the terminal device, to achieve an effect of blind compensation.

In view of this, the embodiments of this application provide a communication method. The communication method is, for example, a power control method. Specifically, in the communication method, the power class of 23 dBm and the power class of 33 dBm can be distinguished during uplink transmission, so that the power class of 33 dBm can always exert the high-power advantage of the terminal device.

Figure 4:
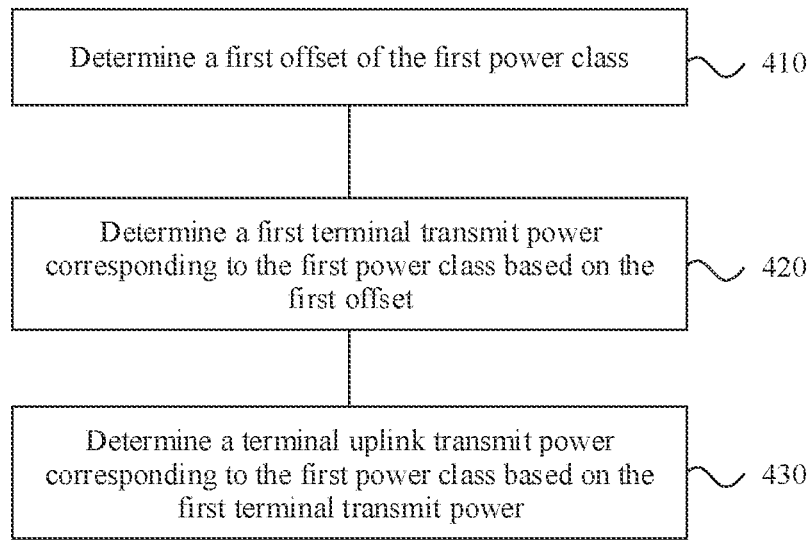
FIG. 4 is a schematic flowchart of a communication method according to an embodiment of this application.

FIG. 4 is a schematic flowchart of a communication method according to an embodiment of this application. The method is used for uplink power control. In this embodiment of this application, the method is performed by a terminal device. Herein, the terminal device supports one or more cell transmit power classes, for example, including a power class of 33 dBm and a power class of 23 dBm. This is not specifically limited in this embodiment of this application.

Specifically, the method shown in FIG. 4 includes 410 to 430.

410. When the terminal device determines that a power class is a first power class, the terminal device determines a first offset of the first power class.

Specifically, when the terminal device having a plurality of transmit power classes performs uplink power control, the terminal device may determine a power class to be used for uplink transmission, for example, the first power class or a second power class. For example, for an eLTE-DSA 230 system, the terminal device may determine that the terminal device uses a maximum transmit power of 33 dBm (namely, a class of 33 dBm), or a maximum transmit power of 23 dBm (namely, a class of 23 dBm), or another maximum transmit power. In other words, in this embodiment of this application, during uplink power control, different power classes can be distinguished. For example, the power class of 23 dBm and the power class of 33 dBm can be distinguished.

In this embodiment of this application, when determining that the power class of the terminal device is the first power class, the terminal device determines the first offset corresponding to the first power class. Specifically, the first offset may be an offset of the first power class relative to the second power class. In other words, a transmit power difference between the terminal device with the first power class and the terminal device with the second power class may be adjusted by configuring the first offset, to achieve an effect of coverage blind compensation.

Optionally, in this embodiment of this application, a value of the first offset may be 0 dB, 2 dB, 4 dB, 6 dB, 8 dB, 10 dB, 12 dB, or 15 dB, or another value. This is not limited in this embodiment of this application.

Optionally, in this embodiment of this application, the terminal device may receive a system message sent by a network device, where the system message includes the first offset. Then, the terminal device may determine the first offset of the first power class based on the system message. In this way, the network device can flexibly configure the first offset. In other words, a transmit power difference between the terminal device with a power class of 33 dBm and the terminal device with a power class of 23 dBm may be adjusted by flexibly configuring the first offset by the network device, making it convenient for the network device to control, to achieve an effect of coverage blind compensation.

Specifically, the system message is, for example, a broadcast message, for example, an SIB1, an SIB2, an SIB3, ..., an SIBX, or the like. This is not limited in this embodiment of this application. X is a positive integer. Alternatively, the broadcast message may be an MIB.

Alternatively, in this embodiment of this application, in the terminal device, the first offset may be pre-stipulated in a protocol. The terminal device may determine the first offset based on the protocol stipulation. This is not limited in this embodiment of this application.

420. The terminal device determines a first terminal transmit power corresponding to the first power class based on the first offset.

In a specific implementation, the terminal device may determine the first terminal transmit power based on the following formula (3):

$$P_{CMAX,c} = \text{Min}(P_{max} + P_{offset}, P_{powerclass}) \quad (3), \text{ where}$$

in the formula (3), $P_{CMAX,c}$ represents the first terminal transmit power, namely, $P_{CMAX,c}$ corresponding to the power class of 33 dBm. $P_{max}$ is a maximum transmit power of the terminal device allowed by a serving cell, $P_{offset}$ represents the first offset, and $P_{powerclass}$ is a maximum transmit power that corresponds to the first power class and that is of the terminal device.

430. The terminal device determines a terminal uplink transmit power corresponding to the first power class based on the first terminal transmit power. The terminal uplink transmit power may be an uplink transmit power corresponding to a PUSCH or a PUCCH.

Specifically, the terminal device may substitute the first terminal transmit power $P_{CMAX,c}$ into the foregoing formula (a) or (b), to obtain the uplink transmit power of the PUSCH, or the uplink transmit power of the PUCCH.

Therefore, in this embodiment of this application, different power classes are distinguished in an uplink power control process. To be specific, when the terminal device has a first transmit power class, the terminal device determines the first terminal transmit power corresponding to the first power class based on the first offset of the first power class, and further determines the terminal uplink transmit power corresponding to the first power class based on the first terminal transmit power. In this embodiment of this application, an appropriate first terminal transmit power ($P_{CMAX,c}$) may be obtained by setting a value of the first offset of the first power class, so that the terminal device with the first power class more easily exerts a high-power advantage, to achieve an effect of coverage blind compensation.

Optionally, in this embodiment of this application, when the terminal device determines that the power class is the second power class, the terminal device determines a second terminal transmit power corresponding to the second power class, and then the terminal device determines a terminal uplink transmit power corresponding to the second power class based on the second terminal transmit power.

Optionally, the terminal device may determine the second terminal transmit power based on the following formula (4):

$$P_{CMAX,c} = \text{Min}(P_{max}, P_{powerclass}) \quad (4), \text{ where}$$

$P_{CMAX,c}$ in the formula (4) represents the second terminal transmit power, namely, $P_{CMAX,c}$ corresponding to the power class of 23 dBm, $P_{max}$ is the maximum transmit power of the terminal device allowed by the serving cell, and $P_{powerclass}$ is a maximum output power that corresponds to the second power class and that is of the terminal device.

The following shows calculation results of $P_{cmax,c}$ c of the NB-IoT/LTE system for different values of $P_{max}$. Specifically. Table 4 shows calculation results of $P_{cmax,c}$ determined by the terminal device when the power class is 33 dBm, where $P_{offset}=2$. Table 5 shows calculation results of $P_{cmax,c}$ determined by the terminal device when the power class is 23 dBm.

TABLE 4

| $P_{max}$ | NB-IoT | LTE | eLTE-DSA |
|---|---|---|---|
| 14 | 14 | 14 | 16 |
| 17 | 17 | 17 | 19 |
| 20 | 20 | 20 | 22 |
| 23 | 23 | 23 | 25 |
| 26 | 23 | 26 | 28 |
| 30 | 23 | 30 | 32 |
| 33 | 23 | 33 | 33 |

TABLE 5

| $P_{max}$ | NB-IoT | LTE | eLTE-DSA |
|---|---|---|---|
| 14 | 14 | 14 | 14 |
| 17 | 17 | 17 | 17 |
| 20 | 20 | 20 | 20 |
| 23 | 23 | 23 | 23 |
| 26 | 26 | 23 | 23 |
| 30 | 30 | 23 | 23 |
| 33 | 33 | 23 | 23 |

It can be learned from Table 4 and Table 5 that, for the LTE system, when $P_{max} \leq 23$ dBm, $P_{cmax,c}$ of the terminal device with a power class of 33 dBm is the same as $P_{cmax,c}$ of the terminal device with a power class of 23 dBm. In addition, only when $P_{max} > 23$ dBm, a value of $P_{cmax,c}$ of the terminal device with a power class of 33 dBm is greater than that of $P_{cmax,c}$ of the terminal device with a power class of 23 dBm, namely, the terminal device with a power class of 33 dBm has a transmit advantage over the terminal device with a power class of 23 dBm. For the eLTE-DSA system, the value of $P_{cmax,c}$ of the terminal device with a power class of 33 dBm is always greater than that of $P_{cmax,c}$ of the terminal device with a power class of 23 dBm. Table 6 shows differences between values of $P_{cmax,c}$ of the terminal device with a power class of 33 dBm and values of $P_{cmax,c}$ of the terminal device with a power class of 23 dBm.

TABLE 6

| Value of $P_{max}$ | 14 | 17 | 20 | 23 | 26 | 30 | 33 |
|---|---|---|---|---|---|---|---|
| 33 dBm | 16 | 19 | 22 | 25 | 28 | 32 | 33 |
| 23 dBm | 14 | 17 | 20 | 23 | 23 | 23 | 23 |
| Difference (dB) | 2 | 2 | 2 | 2 | 5 | 9 | 10 |

In view of this, in a same case, the value of $P_{cmax,c}$ of the terminal device with 33 dBm is greater than that of $P_{cmax,c}$ of the terminal device with 23 dBm, and the terminal device with 33 dBm has an obvious sending advantage. Therefore, in this embodiment of this application, the terminal device with a power class of 33 dBm can always exert a high-power advantage of itself, to achieve an effect of blind compensation. Further, in this embodiment of this application, a new calculation formula of $P_{cmax,c}$ is designed, so that regardless of a value of $P_{max}$, the high-power terminal (namely, the terminal with 33 dBm) can always have a sending advantage over the low-power terminal (the terminal with 23 dBm).

A power ramping mechanism is mainly used in a random access process. The network device presets a preamble initial received target power and a power ramping step. In the embodiments of this application, the power ramping step may also be referred to as a ramping step. In the embodiments of this application, "power ramping step" and "ramping step" are alternately used. When a difference therebetween is not emphasized, meanings expressed by the two are consistent.

Figure 5:
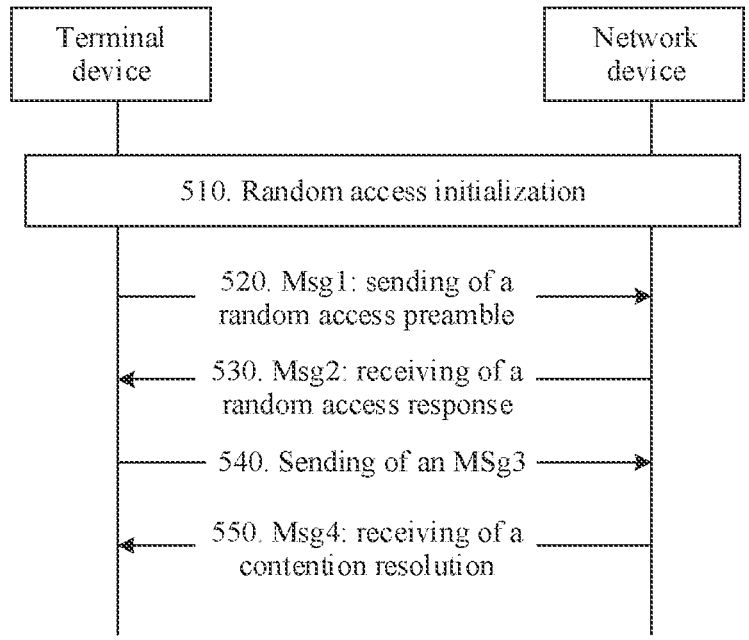
FIG. 5 is a schematic flowchart of a contention-based random access process.
Figure 6:
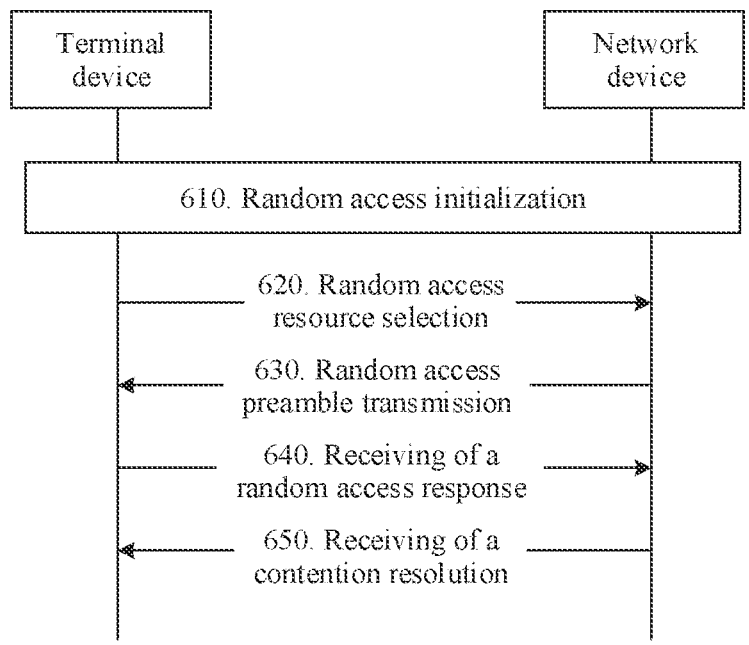
FIG. 6 is a schematic flowchart of another contention-based random access process.

Specifically, when performing random access, each time the terminal device retransmits a message 1 (Msg1), the terminal device adds a fixed ramping step based on a previous transmit power. For example, when the terminal device sends the Msg1 for the first time, a transmit power used by the terminal device is the preset preamble initial received target power. When the Msg1 is retransmitted for the second time, a transmit power used is a sum of the preset preamble initial received target power and the ramping step. When the Msg1 is retransmitted for the third time, a transmit power used is a sum of the transmit power used when the Msg1 is retransmitted for the second time and the ramping step, and so on, thereby improving a random access success rate. FIG. 5 is a schematic flowchart of a contention-based random access process of an LTE system. FIG. 6 is a schematic flowchart of a random access process of a 230 system. As shown in FIG. 5, contention-based random access of the LTE system may generally include steps 510 to 550. As shown in FIG. 6, contention-based random access of the 230 system may generally include steps 610 to 650.

The following describes the contention-based random access process of the LTE system in detail with reference to FIG. 5.

510. Random access initialization.

The random access process is triggered by a PDCCH order, or a MAC sublayer, or an RRC sublayer itself. If a terminal device receives PDCCH transmission that is scrambled by using a C-RNTI and consistent with a PDCCH order, the random access process will be triggered. The PDCCH order or an RRC message can indicate preamble indexes RA-Preamble Index (there are a total of 64 types) and physical layer random access channel indexes RA-PRACH-Mask Index (there are a total of 16 types) used during resource selection of the random access process.

A preamble index and a physical layer are used for indicating a preamble used for random access. When a value of the preamble index is 000000, it indicates that the random access is initiated by the MAC sublayer, namely, the preamble is selected by the MAC sublayer itself, and correspondingly, contention random access is performed. When the value of the preamble index is not 000000, the terminal device performs random access by using the preamble indicated by the preamble index, namely, performs contention-free random access. The physical layer physical access channel index RA-PRACH-Mask Index is used for indicating that the terminal device may send the preamble on a PRACH corresponding to which subframe in a system frame. The terminal device may look up in a corresponding table by using the RA-PRACH-Mask Index, to determine the preamble and available physical resources.

To perform random access initialization, parameters need to be configured. These parameters include:

a PRACH resource set (for example, PRACH-Config Index) that may be used for transmitting a random access preamble;

an available group of random access preambles (a group A or group B) and an available preamble set in each group;

a maximum quantity of times of preamble transmission (preamble trans-Max);

a preamble initial target received power (preamble initial received target power);

a power ramping step;

a random access response window (RA-response window Size);

a maximum quantity of times of HARQ retransmission of a third message (Msg3)(max HARQ-Msg3); and a contention resolution timer (mac-contention Resolution Timer).

It should be noted that, before a random access process is triggered each time, the foregoing configured parameters may be updated by using a higher-layer configuration. After obtaining the foregoing parameters, the terminal device performs the following operations: clearing a buffer of the Msg3: setting a quantity of times of preamble sending (PREAMBLE_TRANSMISSION_COUNTER) to 1; and setting a backoff parameter value stored in the terminal device to 0 ms, and entering a random access resource selection phase.

It should be further noted that the terminal device performs only one random access process at any moment. If the terminal device receives a newly initiated random access request in one random access process, implementation on the terminal device side determines to continue the ongoing random access process or start a new random access process.

520. Msg1: sending of a random access preamble.

Specifically, the preamble is carried in the first message (Msg1). A main function of the preamble is to notify a network device that there is a random access request, and enable the network device to estimate a transmission delay between the network device and the terminal device, so that the network device can calibrate an uplink advance (uplink timing) and notify the terminal device of calibration information by using a timing advance (timing advance command).

If the terminal device initiates random access, the terminal device selects a PRACH from an available physical random access resource set and selects a preamble from an available preamble set, and then sends the preamble on the selected PRACH. A power value used for sending the preamble may be calculated based on the following formulas. It may be understood that the following formulas are merely used as examples. In different cases, there may be many variations in formulas of a target transmit power. These variations all fall within the protection scope of the embodiments of this application. This is not limited in the embodiments of this application.

Specifically, for the LTE system, a preamble received target power (PREAMBLE_RECEIVED_TARGET_POWER) may be set to:

preambleInitialReceivedTargetPower+
DELTA_PREAMBLE+(PREAMBLE_
TRANSMISSION_COUNTER−1)×powerRamp-
ingStep.

For an NB-IoT system, a target transmit power (PREAMBLE_RECEIVED_TARGET_POWER) may be set to:

preambleInitialReceivedTargetPower+
DELTA_PREAMBLE+(PREAMBLE_
TRANSMISSION_COUNTER−1)×powerRampingStep.

Further, the terminal device further corrects the preamble received target power based on a quantity of times of broadcast repetition (numRepetitionPerPreambleAttempt).

Specifically, in the NB-IoT system, the terminal device determines a coverage level of the terminal device by comparing an RSRP measured by the terminal device with an RSRP threshold configured by the network device. For example, when the measured RSRP<=an RSRP threshold 1, it may be determined that the coverage level of the terminal device is 0. When the RSRP threshold 1<the measured RSRP<=an RSRP threshold 2, it may be determined that the coverage level of the terminal device is 1. When the measured RSRP>the RSRP threshold 2, it may be determined that the coverage level of the terminal device is 2.

For the coverage level 0, PREAMBLE_RECEIVED_TARGET_POWER may be set as follows:

PREAMBLE_RECEIVED_TARGET_POWER−10×
log 10(KnumRepetitionPerPreambleAttempt).

For other coverage levels, PREAMBLE_RECEIVED_TARGET_POWER may be set to a maximum transmit power of the terminal device.

530. Msg2: receiving of a random access response (RAR).

Specifically, the terminal device may monitor a PDCCH by using a random access radio network temporary identifier (RA-RNTI). Specifically, how the terminal device determines the RA-RNTI is specifically described below. If receiving scheduling information belonging to the terminal device, namely, downlink control information (DCI), the terminal device receives, on a PDSCH based on the DCI information, an RAR message delivered by the network device. The DCI information includes related content such as resource block (RB) allocation information, a modulation and coding scheme (MCS), and the like.

Specifically, the random access response is carried in the second message (Msg2). After sending the preamble, the terminal device monitors the corresponding PDCCH in an RAR response window based on an RA-RNTI value corresponding to the preamble. If a preamble carried in the response received by the terminal device is consistent with the preamble sent by the Msg1, the terminal device stops monitoring the RAR.

The RA-RNTI is calculated by using the following formula:

RA-RNTI=$t\_id+10 \times f\_id$, where t_id is an index of a first subframe of a PRACH resource, and 0≤t_id<10; f_id is an index of the PRACH resource used for sending the Msg1 in frequency domain with an ascending order, and 0≤f_id<6.

In a receive window of the Msg2, if the terminal device successfully receives the RAR, that is, a random access preamble index carried in the RAR is consistent with a preamble index sent by the Msg1, the terminal device stops monitoring the RAR.

Figure 7:
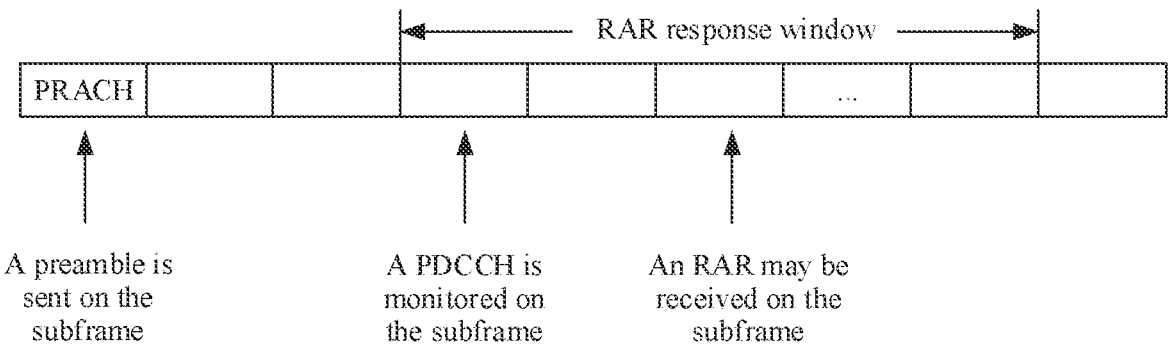
FIG. 7 is a schematic diagram of an RA response window according to an embodiment of this application.

FIG. 7 is a schematic diagram of an RA response window according to an embodiment of this application. Herein, the RAR response window starts at a third subframe after a subframe on which the preamble is sent, and continues for ra-response window size subframes. It should be noted that, if the preamble spans a plurality of subframes in time domain, a last subframe is used for calculation.

If the terminal device does not receive the RAR in the RAR response window, or no preamble in the received RAR is consistent with the preamble of the terminal device, it is considered that the terminal device fails to receive the RAR this time. In this case, the terminal device needs to wait for a period of time before initiating random access, and increases a preamble sending counter by 1.

540. Sending of an MSg3.

The terminal device sends the Msg3 message to the network device based on uplink grant and TA information in the Msg2 by using a physical uplink shared channel (PUSCH). Herein, a reason why the message is referred to as the Msg3 instead of a specific message is that the message may be different based on different states of the terminal device and different application scenarios. Therefore, the message is collectively referred to as the Msg3, namely, the third message.

The Msg3 message may be classified into the following types: an RRC connection request, a tracking area data update, and a resource scheduling request. Specifically, the Msg3 message is shown in Table 7.

TABLE 7

| Random access reason | Message type | Terminal device identifier |
|---|---|---|
| Initial network access | RRC connection request | NAS terminal device ID (S-TMSI) or random number |
| RRC connection reestablishment | RRC connection reestablishment request | C-RNTI |
| Handover | Handover message | C-RNTI |
| Downlink data arrival | C-RNTI MAC control element | C-RNTI |
| Uplink data arrival | C-RNTI MAC control element | C-RNTI |

550. Msg4: receiving of a contention resolution.

When a plurality of terminal devices initiate random access by using a same preamble, contention occurs. At most only one terminal device in the terminal devices that contend for a same resource can successfully access. In this case, the network device sends a contention resolution message to the terminal device by using the PDSCH.

Specifically, after completing sending the Msg3, the terminal device starts a contention resolution timer (mac-contention resolution Timer), and monitors the PDCCH by using a temporary C-RNTI indicated in the RAR or a C-RNTI pre-configured by the network device. If the terminal device receives the contention resolution message sent by the network device to the terminal device before the contention resolution timer expires. If contention resolution fails, and in this case, if a random access sending counter does not reach a maximum quantity of times of sending, the counter is increased by 1. Otherwise, it is considered that random access fails.

The following describes in detail the contention-based random access process of the 230 system with reference to FIG. 6.

610. Random access initialization.

The random access process is triggered by a PDCCH order, a MAC layer itself, or an RRC layer. If a terminal device receives a PDCCH order indicated by PDCCH transmission scrambled by using a C-RNTI, the random access process will be triggered. For serving cell based random access, the PDCCH order may indicate a starting quantity of times of repetition of a PRACH, ra-PRACH-CarrierIndex, and ra-PreambleIndex. Before the random access process is triggered, it is assumed that the following information is known:
- a) a PRACH resource set that may be used for transmitting a random access preamble, prach-ConfigPerCoverage;
- b) for random access resource selection and random access preamble transmission:
  1) a PRACH resource set is mapped onto a random access resource pool corresponding to PLMN-Identity;
  2) a PRACH resource in each resource set maps an enhanced coverage level;
  3) each PRACH resource includes PRACH carriers with a quantity of prach-NumCarriers;
  4) each PRACH carrier sets a group of random access preambles for random access, where the random access preambles are indicated by prach-StartPreambleIndexRA and prach-EndPreambleIndexRA or startIndexSR and endIndexSR;
  5) if a network device sends a carrier index to a configured CBSR, the carrier index is indicated by startCarrierIndex;
  6) if the PDCCH order sent by the network device explicitly includes a carrier index, the terminal device needs to use ra-PRACH-CarrierIndex as a carrier index used for sending a preamble;
  7) if the PDCCH order sent by the network device explicitly includes a preamble index, the terminal device needs to use ra-PreambleIndex as a preamble index used for sending a signal;
  8) a serving cell supports a random access response window size, ra-ResponseWindowSize; and
  9) a contention resolution timer supported by the serving cell, mac-ContentionResolutionTimer.
- c) Mapping between PRACH resources and enhanced coverage levels is determined by the following description:
  1) a quantity of enhanced coverage levels is equal to a quantity of RSRP thresholds indicated in rsrp-ThresholdsPrachInfoList plus 1;
  2) each enhanced coverage level corresponds to one PRACH resource, indicated by prach-ConfigPerCoverage; and
  3) the enhanced coverage levels start to be numbered from 0, and the mapping between the PRACH resources and the enhanced coverage levels is completed in ascending order of numRepetitionPerPreambleAttempt.
- d) a PRACH resource set is selected based on RSRP measurement of each enhanced coverage level supported by the serving cell, rsrp-ThresholdsPrachInfoList;
- e) a maximum quantity of times of transmission in each attempt of preamble transmission on each enhanced coverage level supported by the serving cell, maxNumPreambleAttemptCE;
- f) a quantity of times of repetition required in each attempt of preamble transmission on each enhanced coverage level supported by the serving cell, numRepetitionPerPreambleAttempt;
- g) a sending power in the random access process of the terminal device;
- h) a power rising factor, powerRampingStep;
- i) a maximum quantity of times of preamble transmission, preambleTransMax-CE;
- j) a preamble initial transmit power, preambleInitialReceivedTargetPower;
- k) a preamble format based offset, set to 0. DELTA_PREAMBLE;
- l) a PRACH transmission period, where an actual value is period×repetitionNumber frames;
- m) duration: duration that may be occupied by PRACH transmission of the terminal device, where an actual value is duration×repetitionNumber frames; and
- n) a PRACH start frame position offset, where an actual value is (hyper-frame number×1024+frame number) mod (period×repetitionNumber)=repetitionNumber× offset×period, and if the period is less than 8, see Table 8 for the value of the offset.

TABLE 8

| period | offset |
|--------|--------|
| 1 | 0 |
| 2 | 0, 1/2 |
| 4 | 0, 1/4, 1/2, 3/4 |

620. Random access resource selection.

A process of the random access resource selection should satisfy the following steps:
- a) If the random access process is triggered by the CBSR, select startCarrierIndex and randomly select a preamble from a set {startIndexSR, endIndexSR} indicated by PhysicalConfigDedicated-DSA, where a random function needs to satisfy a requirement that each preamble that can be selected is selected at a same probability.
- b) Otherwise, if ra-PRACH-CarrierIndex and ra-PreambleIndex (random access preamble) are explicitly signaled, a PRACH resource is a value explicitly signaled.
- c) Otherwise, the random access preamble should be selected by the terminal device based on the following steps:
  1) Select a random access resource pool based on PLMN-Identity indicated by an upper layer.
  2) Select PRACH resources in a pool corresponding to a selected enhanced coverage level.
  3) Randomly select a PRACH carrier from the PRACH resources, where a random function needs to satisfy a requirement that each carrier that can be selected is selected at a same probability.
  4) If the random access process is performed due to initial access or RRC connection reestablishment, randomly select a random access preamble from random access preambles indicated by {prach-StartPreambleIndexRA, prach-EndPreambleIndexRA), where a random function needs to satisfy a requirement that each preamble that can be selected is selected at a same probability; otherwise, if the random access process is performed based on a scheduling request, randomly select a random access preamble from random access preambles indicated by {startIndexSR, endIndexSR}, where a random function needs to satisfy a requirement that each preamble that can be selected is selected at a same probability; otherwise, randomly select a random access preamble from random access preambles indicated by (prach-StartPreambleIndexRA, prach-EndPreambleIndexRA} or {startIndexSR, endIndexSR}, where a random function needs to satisfy a requirement that each preamble that can be selected is selected at a same probability.

5) Randomly select a cyclic shift from four available numbers, to select a random access preamble, where a random function needs to satisfy a requirement that each number that can be selected is selected at a same probability.

d) Determine a next available PRACH start frame.

e) Select ra-ResponseWindowSize and mac-ContentionResolutionTimer.

f) Perform a process of transmitting the random access preamble.

630. Random access preamble transmission.

The process of transmitting the random access preamble should satisfy the following requirements:

a) PREAMBLE_RECEIVED_TARGET_POWER is set to preambleInitialReceivedTargetPower+ DELTA_PREAMBLE+(PREAMBLE_TR ANSMISSION_COUNTER−1)×powerRampingStep;

b) PREAMBLE_RECEIVED_TARGET_POWER is set to PREAMBLE_RECEIVED_TARGET_POWER− 10×log 10(numRepetitionPerPreambleAttempt); and c) a physical layer is indicated to send the random access preamble based on the quantity of times of repetition for preamble transmission (namely, numRepetitionPerPreambleAttempt) corresponding to the selected preamble group by using the selected PRACH corresponding to the selected random access resource pool, the selected enhanced coverage level, a corresponding RA-RNTI, the preamble index, the carrier index, and PREAMBLE_RECEIVED_TARGET_POWER.

640. Receiving of a random access response.

Once the random access preamble is transmitted, the terminal device should monitor, in a random access response window, the random access response that is identified by the RA-RNTI (see a formula (h)) and that is on a PDCCH corresponding to a random access response of the serving cell. The random access response window starts at a frame that contains the end of preamble repetition plus two frames and has a length of ra-ResponseWindowSize corresponding to different enhanced coverage levels. For each enhanced coverage level, one or more carriers are configured in prach-ConfigPerCoverage, to carry the PDCCH used for scheduling the random access response and the message 3. For calculation of a relative carrier index that corresponds to one preamble and that carries PDCCH information, see a formula (i). After successfully receiving a random access response that includes a random access preamble identifier that matches the sent random access preamble and a preamble cyclic shift index, the terminal device may stop monitoring the random access response. The steps are as follows:

a) If the terminal device receives, in the TTI, downlink assignment indicated by a PDCCH scrambled by using an RA-RNTI, and a received TB is successfully decoded, 1) if the random access response includes a backoff indication subheader, a backoff parameter value on the terminal device side is set based on a BI field in the backoff indication subheader and Table 136; and otherwise, the backoff parameter value on the terminal device side is set to 0 ms;

2) if the random access response includes a random access preamble identifier the same as the transmitted random access preamble identifier and the preamble cyclic shift index, a MAC entity of the terminal device should consider that this random access response is successfully received, and perform the following operations on the serving cell that sends the random access preamble: processing a received timing advance command; indicating preambleInitialReceivedTargetPower and a power ramping amount applied to a most recent preamble sending process (namely, (PREAMBLE_TRANSMISSION_COUNTER−1)×powerRampingStep) to a lower layer, and processing a received uplink grant, and indicating the received uplink grant to the lower layer. Before a first transmission is performed based on the uplink grant in the random access response, a value carried in the random access response is set to a temporary C-RNTI; if the random access response is a random access response that is successfully received for the first time in this random access process: if this transmission is not used for a CCCH logical channel, a multiplexing and assembly entity is indicated to include a C-RNTI MAC control element in subsequent uplink transmission; and a to-be-transmitted MAC PDU is obtained from the multiplexing and assembly entity and is stored in a buffer of the message 3;

3) when uplink transmission is required, for example, for contention resolution, the network device should provide an uplink grant of no less than 104 bits in the random access response; and 4) in the random access process, for a same random access preamble group, if a size of an uplink grant provided by the random access response is different from a size of a first uplink grant assigned in this random access process, a behavior of the terminal device is not defined.

b) If no random access response is received in the random access response window, or none of received random access responses includes a random access preamble identifier that matches the transmitted random access preamble, it is considered that the random access response is not received successfully, and the MAC entity of the terminal device should perform the following operations:

1) if no power ramping suspension notification is received from the lower layer, PREAMBLE_TRANSMISSION_COUNTER is increased by 1;

2) if REAMBLE_TRANSMISSION_COUNTER=preambleTransMax-CE+1;

3) if the random access preamble is sent in the serving cell, a random access problem is indicated to the upper layer, and it is considered that the random access process is not successfully completed;

4) if the random access preamble is selected by the MAC in this random access process, based on the backoff parameter on the terminal device side and by using a uniform distribution principle between 0 and the backoff parameter value, a backoff time is randomly selected, and next random access transmission is delayed by the backoff time;

5) PREAMBLE_TRANSMISSION_COUNTER_CE is increased by 1, and if PREAMBLE_TRANSMISSION_COUNTER_CE= maxNumPreambleAttem ptCE of the corresponding enhanced coverage level+1;

6) PREAMBLE_TRANSMISSION_COUNTER_CE is reset; if the serving cell and the terminal device support, the terminal device considers entering a next enhanced coverage level; and otherwise, a current enhanced coverage level is maintained; if the random access process is triggered by the CBSR, and if PREAMBLE_TRANSMISSION_COUNTER<preambleTransMax-CE+1, it is considered that a subsequent random access process is not triggered by the CBSR: if the random access process is triggered by the PDCCH order, PRACH resources corresponding to the selected coverage enhancement level are selected, and it is considered that the selected PRACH resources are explicitly signaled; and 7) a random access resource selection process is performed.

g) See the formula (h) for the RA-RNTI related to the PRACH resources used for sending the random access preamble.

$$RA\text{-}PDCCH\text{-}Index=((RA\text{-}PRACH\text{-}Index)\times(RA\text{-}Preamble\text{-}Number-1)+RA\text{-}Preamble\text{-}Index) \bmod RA\text{-}PDCCH\text{-}Number \qquad (i)$$

where in the formula.

RA-PARCH-Index is a relative carrier index of a PRACH that carries a preamble. Preamble-Index is an absolute preamble index selected by the terminal device from {prach-StartPreambleIndexRA, prach-EndPreambleIndexRA} or {startIndexSR, endIndexSR}. If Preamble-Index is selected by the terminal device from {prach-StartPreambleIndexRA, prach-EndPreambleIndexRA}, RA-Preamble-Number is a quantity of preambles in the available preamble set {prach-StartPreambleIndexRA, prach-EndPreambleIndexRA}, and otherwise, RA-Preamble-Number is a quantity of preambles in the available preamble set {startIndexSR, endIndexSR}; and RA-PDCCH-Number is a quantity of PDCCH carriers corresponding to the PRACH resources. For a group of carriers, a relative carrier index number of a carrier with a smallest logic index is 0, and a relative carrier index number of a carrier with a second smallest logic index is 1, and so on.

$$RA\text{-}RNTI=SFN\_id+481 \qquad (h)$$

where in the formula:

SFN_id is an index of a first frame of a specified PRACH resource.

650. Receiving of a contention resolution.

The contention resolution is performed based on a C-RNTI on a PDCCH or a terminal device contention resolution identifier on a DL-SCH of the serving cell. Once the message 3 is transmitted, the MAC entity of the terminal device should satisfy the following requirements:

a) the MAC-contention resolution timer mac-ContentionResolutionTimer is started, and the timer mac-ContentionResolutionTimer is restarted when a HARQ is bound to retransmit the frame that contains the end of the last repetition of PUSCH transmission plus two subframes;

b) the PDCCH is monitored until the timer mac-ContentionResolutionTimer expires or is stopped;

c) if a notification of reception of PDCCH transmission is received from the lower layer, the MAC entity of the terminal device should:

1) if the message 3 includes a C-RNTI MAC control element: if the random access process is triggered by the MAC or the RRC sublayer itself, and the PDCCH transmission is scrambled by using a C-RNTI and includes an uplink grant of new data transmission, or if the random access process is triggered by a PDCCH order, and the PDCCH transmission is scrambled by using the C-RNTI, it is considered that the contention resolution succeeds; and then the timer mac-ContentionResolutionTimer is terminated, and a temporary C-RNTI is discarded, and it is considered that this random access process is successfully completed; and 2) otherwise, if the message 3 includes a CCCH SDU and the PDCCH transmission is scrambled by using the temporary C-RNTI: if the MAC PDU is successfully decoded, the timer mac-ContentionResolutionTimer is terminated: if the MAC PDU includes a terminal device contention resolution identifier MAC control element, and the terminal device contention resolution identifier in the MAC control element matches first 48 bits of the CCCH SDU transmitted in the message 3, it is considered that this contention resolution succeeds, and splitting and demultiplexing of the MAC PDU are completed, the temporary C-RNTI is set to a value of the C-RNTI, then, the temporary C-RNTI is discarded, and finally it is considered that this random access process is successfully completed; and otherwise, the temporary C-RNTI is discarded and it is considered that this contention resolution is unsuccessful, and the successfully decoded MAC PDU is discarded.

d) If the timer mac-ContentionResolutionTimer expires, 1) the temporary C-RNTI is discarded;

2) it is considered that this contention resolution is unsuccessful, and the successfully decoded MAC PDU is discarded:

3) if the contention resolution is unsuccessful, the MAC entity of the terminal device should clear a HARQ buffer used for transmitting the MAC PDU in the buffer of the message 3;

4) if no power ramping suspension notification is received from the lower layer, PREAMBLE_TRANSMISSION_COUNTER is increased by 1; if PREAMBLE_TRANSMISSION_COUNTER=preambleTransMax-CE+1, a random access problem is indicated to the upper layer; and it is considered that the random access process is not successfully completed;

5) then, based on the backoff parameter on the terminal device side and by using a uniform distribution principle between 0 and the backoff parameter value, a backoff time is randomly selected;

6) next random access transmission is delayed by the backoff time; and 7) the random access resource selection process is started.

In the foregoing power ramping mechanism, a preamble initial received power and/or ramping step of a terminal device with a power class of 23 dBm are not distinguished from those of a terminal device with a power class of 33 dBm. For a communications system supporting a terminal maximum transmit power of 33 dBm (for example, an eLTE-DSA system), in a scenario in which 23 dBm and 33 dBm are mixed, if power ramping is performed in the foregoing manner, the terminal device with 33 dBm located on an edge needs to perform the power ramping for a plurality of times to reach the maximum transmit power, bringing an unnecessary retransmission delay.

In view of this, the embodiments of this application provide a communication method. In the communication method, a preamble initial received target power and/or ramping step of a power class of 23 dBm can be distinguished from those of a power class of 33 dBm in a random access process, so that the terminal device with 33 dBm located on the edge can more easily reach the maximum transmit power, and further more easily performs random access.

Figure 8:
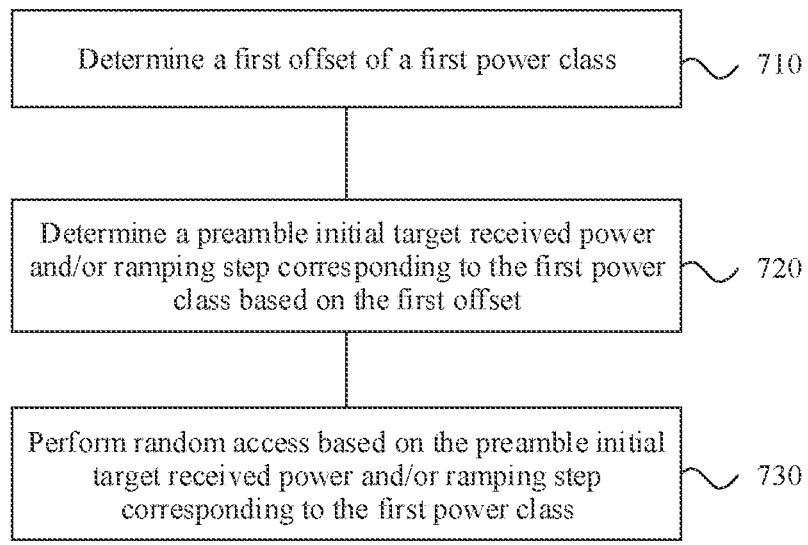
FIG. 8 is a schematic flowchart of a communication method according to an embodiment of this application.

FIG. 8 is a schematic flowchart of a communication method according to an embodiment of this application. The method is used for random access. In this embodiment of this application, the method is performed by a terminal device. Herein, the terminal device supports one or more cell transmit power classes, for example, including a power class of 33 dBm and a power class of 23 dBm. This is not specifically limited in this embodiment of this application.

Specifically, the method shown in FIG. 8 includes 710 to 730.

710: When a power class of the terminal device is a first power class, the terminal device determines a first offset of the first power class.

Specifically, when the terminal device having a plurality of transmit power classes performs random access, the terminal device may determine a power class to be used for uplink transmission, for example, the first power class or a second power class. For example, for an eLTE-DSA 230 system, the terminal device may determine that the terminal device uses a maximum transmit power of 33 dBm (namely, a class of 33 dBm), or a maximum transmit power of 23 dBm (namely, a class of 23 dBm), or another maximum transmit power. In other words, in this embodiment of this application, during random access, different power classes can be distinguished. For example, the power class of 23 dBm and the power class of 33 dBm can be distinguished.

Specifically, when determining that the power class of the terminal device is the first power class, the terminal device determines the first offset corresponding to the first power class. Specifically, the first offset may be an offset of the first power class relative to the second power class, or an offset of a preamble received target power of the first power class relative to an initialized preamble received target power, or an offset of a ramping step of the first power class relative to an initialized ramping step. In other words, a difference between initial received powers of the terminal device with the first power class and the terminal device with the second power class and/or a difference between ramping steps may be adjusted by configuring the first offset, or a difference between the preamble received target power of the terminal device with the first power class and the initialized preamble received target power and/or a difference between ramping steps may be adjusted by configuring the first offset.

Optionally, a value of the first offset may be 0 dB, 2 dB, 4 dB, 6 dB, 8 dB, 10 dB, 12 dB, or 15 dB, or another value. This is not limited in this embodiment of this application.

Specifically, in this embodiment of this application, the terminal device may receive a system message sent by a network device, where the system message includes the first offset. Then, the terminal device may determine the first offset of the first power class based on the system message. In this way, the network device can flexibly configure the first offset. In other words, a difference between power ramping of the terminal device with a power class of 33 dBm and power ramping of the terminal device with a power class of 23 dBm may be adjusted by configuring the first offset by the network device, making it convenient for the network device to control, to reduce an unnecessary random access delay.

Specifically, the system message is, for example, a broadcast message, for example, an SIB1, an SIB2, an SIB3, . . . , an SIBX, or the like. This is not limited in this embodiment of this application. X is a positive integer. Alternatively, the broadcast message may be an MIB.

Alternatively, in this embodiment of this application, in the terminal device, the first offset may be pre-stipulated in a protocol. The terminal device may determine the first offset based on the protocol stipulation. This is not limited in this embodiment of this application.

720. The terminal device determines a preamble initial target received power and/or ramping step corresponding to the first power class based on the first offset.

Specifically, the terminal device may add the first offset to the initialized preamble initial target received power, to obtain the preamble initial target received power corresponding to the first power class, and/or the terminal device may add the first offset to the initialized ramping step, to obtain the ramping step corresponding to the first power class.

Specifically, refer to the description in FIG. 5 for the initialized preamble initial target received power or the initialized ramping step. In a possible implementation, the initialized preamble initial target received power or the initialized ramping step may be the preamble initial target received power or ramping step corresponding to the second power class. This is not limited in this embodiment of this application.

730. The terminal device performs random access based on the preamble initial target received power and/or ramping step corresponding to the first power class.

Therefore, in this embodiment of this application, different power classes are distinguished in a random access process. To be specific, when the terminal device has a first transmit power class, the terminal device determines the preamble initial target received power and/or ramping step corresponding to the first power class based on the first offset of the first power class, and further performs random access based on the preamble initial target received power and/or ramping step. In this embodiment of this application, an appropriate preamble initial target received power and/or ramping step may be obtained by setting a value of the first offset of the first power class, so that the terminal device with a first power class more easily reaches a maximum transmit power, and further more easily performs random access.

Optionally, in this embodiment of this application, when the terminal device determines that the power class is the second power class, the terminal device determines the preamble initial target received power and/or ramping step corresponding to the second power class, and then the terminal device performs random access based on the preamble initial target received power and/or ramping step corresponding to the second power class.

In an implementation, the preamble initial target received power or ramping step corresponding to the second power class may be the initialized preamble initial target received power and or the initialized ramping step.

In another implementation, the preamble initial target received power or ramping step corresponding to the second power class may be the initialized preamble initial target received power or the initialized ramping step plus an offset. The offset corresponding to the second power class is less than the first offset corresponding to the first power class, so that the terminal device with the first power class more easily reaches the maximum transmit power, and further more easily performs random access. In other words, the preamble initial target received power and/or ramping step may be separately configured for the first power class and the second power class. The terminal device may select a corresponding preamble initial target received power and/or ramping step based on a power class of itself (for example, the power class of 23 dBm or the power class of 33 dBm).

Optionally, the system message in the foregoing 710 may further include the offset corresponding to the second power class, or the offset corresponding to the second power class may be stipulated by a protocol. This is not limited in this embodiment of this application.

Figure 9:
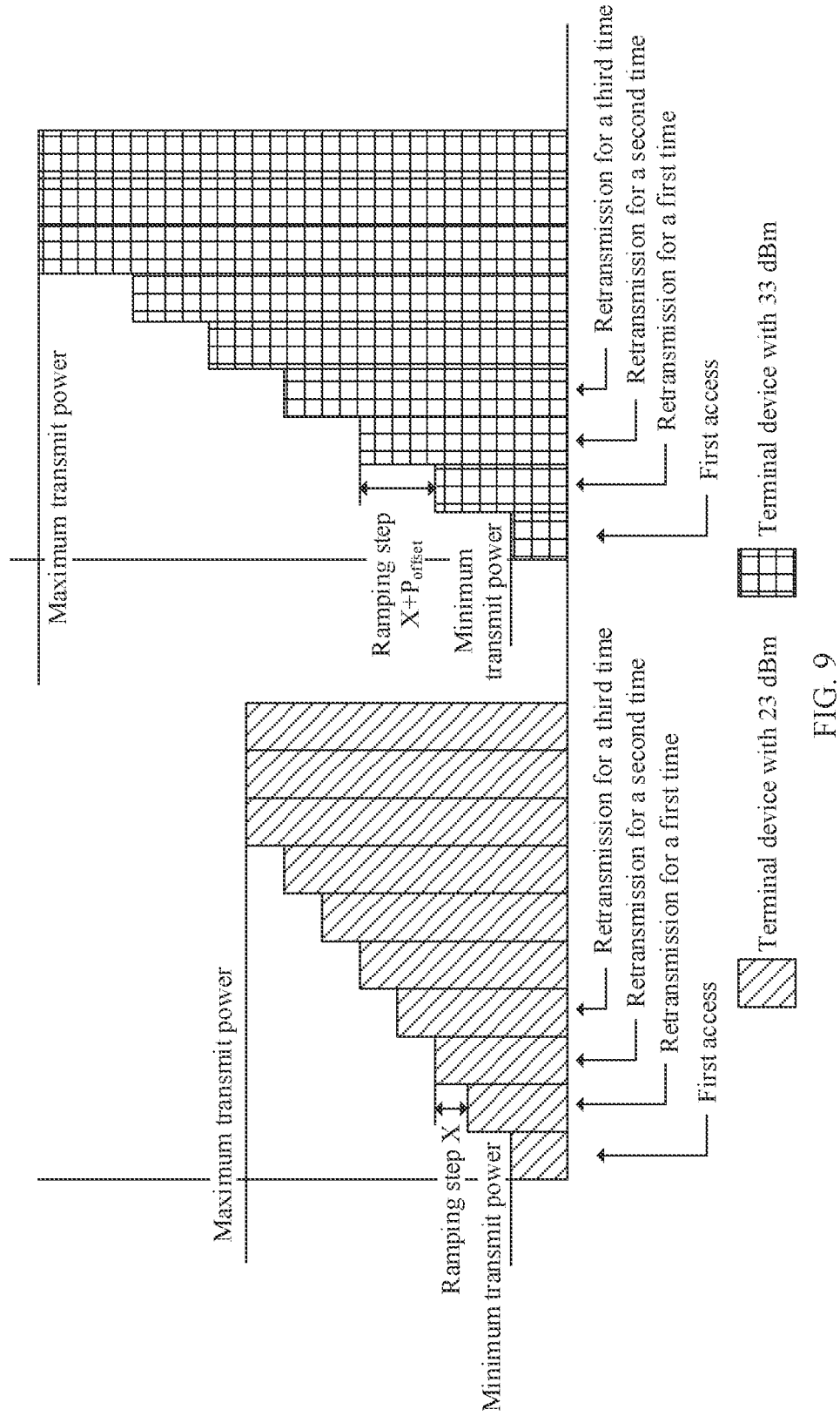
FIG. 9 shows an example of a power ramping mechanism according to an embodiment of this application.

FIG. 9 shows an example of a power ramping mechanism according to an embodiment of this application. As shown in FIG. 9, a network device may set a first offset of a power class of 33 dBm of a terminal device to $P_{offset}$, and the terminal device may determine, based on the first offset, that a ramping step of the power class of 33 dBm is a ramping step of a power class of 23 dBm plus the first offset. In other words, a terminal device with a power class of 23 dBm may have a same minimum transmit power as a terminal device with a power class of 33 dBm. The ramping step of the power class of 33 dBm is greater than the ramping step of the power class of 23 dBm by $P_{offset}$. Therefore, after a same quantity of times of retransmission, the terminal device with 33 dBm can reach a higher maximum transmit power, and therefore the terminal device with 33 dBm more easily performs random access.

A data volume and power headroom report (DPR) is used for notifying the network device of a data volume range and a remaining power range that are to be reported in a buffer. The DPR may be reported with an Msg3, so that the network device may schedule the terminal based on DPR information, namely, performs resource allocation. In this embodiment of this application, for a communications system supporting a terminal maximum transmit power of 33 dBm (for example, an eLTE-DSA system), in a scenario in which 23 dBm and 33 dBm are mixed, w % ben the DPR is reported, the power class of 23 dBm needs to be distinguished from the power class of 33 dBm.

In this embodiment of this application, a new DPR PH reporting mapping result is designed for the power class of 23 dBm and the power class of 33 dBm. As shown in Table 9, the terminal device selects a corresponding power headroom (PH) reporting mapping table based on a transmit power class and a coverage level of the terminal device. Table 10 and Table 11 separately show PHR mapping tables provided in this embodiment of this application.

TABLE 9

| Power class | Coverage level 0 | Coverage level 1 | Coverage level 2 |
| --- | --- | --- | --- |
| 23 dBm | Table 8 | Table 9 | Table 9 |
| 33 dBm | Table 8 | Table 8 | Table 9 |

TABLE 10

| Reported value | Measurement quantity (dB) |
| --- | --- |
| PH_0 | [−54] ≤ PH < [6] |
| PH_1 | [6] ≤ PH < [9] |
| PH_2 | [9] ≤ PH < [12] |
| PH_3 | PH ≥ [12] |

TABLE 11

| Reported value | Measurement quantity (dB) |
| --- | --- |
| PH_0 | [−54] ≤ PH < [3] |
| PH_1 | [3] ≤ PH < [6] |
| PH_2 | [6] ≤ PH < [9] |
| PH_3 | PH ≥ [9] |

However, when the terminal device performs DPR PH reporting based on the foregoing Table 8 to Table 11, there are also the following problem: When receiving the DPR, the network device does not know whether the DPR is reported by the terminal device with a power class of 23 dBm or the terminal device with a power class of 33 dBm. For example, if the terminal device reports "PH=1," the network device does not know whether a reporting range corresponding to "PH=1" is "6 to 9" or "3 to 6." Therefore, in this embodiment of this application, when reporting the DPR information, the terminal device may indicate a power class corresponding to the DPR, so that the network device knows whether the currently reported DPR information belongs to the terminal device with a power class of 23 dBm or the terminal device with a power class of 33 dBm.

Specifically, the terminal device may indicate the power class corresponding to the reported DPR in the following three manners:

in a first manner, the terminal device may add, to the Msg3, an indication of whether 33 dBm is supported;

in a second manner, the terminal device indicates a type of the reported DPR by using a reserved bit in the DPR information; and in a third manner, the terminal device indicates the type of the reported DPR by using a reserved logical channel identity (LCID).

For the first manner, the terminal device may newly add indication information to an RRC message, to indicate that the terminal device supports a first power class. For example, the first power class is the power class of 33 dBm. After receiving the indication information, the network device may determine that the DPR corresponds to the power class of 33 dBm. Otherwise, if the network device does not receive the indication information, the network device determines that the DPR corresponds to a second power class, namely, the power class of 23 dBm. For example, the indication information may be as follows:

powerClassDSA-33 dBm ENUMERATED{supported} OPTIONAL

Optionally, the RRC message includes an RRC connection establishment request message, or an RRC reestablishment request message, or an RRC resume request message. This is not limited in this embodiment of this application.

For the second manner, the terminal device may indicate the type of the reported DPR, to be specific, whether the terminal that reports the DPR corresponds to the power class of 23 dBm or the power class of 33 dBm, by using the reserved bit in the DPR information.

Figure 10:
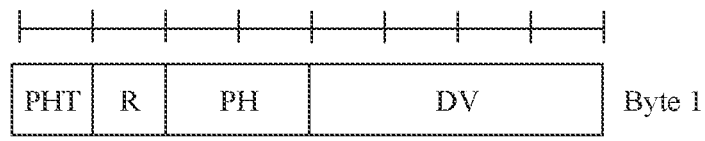
FIG. 10 is a schematic diagram of an existing DPR structure.

FIG. 10 is a schematic diagram of an existing DPR structure. R is Reserved, namely, a reserved bit. In the embodiments of this application, whether a PH field in the reported DPR corresponds to the terminal device with a power class of 23 dBm or the terminal device with a power class of 33 dBm may be indicated by using the reserved bit, or the reserved bit may be used for indicating whether the terminal device supports the power class of 33 dBm. PHT is a PH type. For example, if a PH type field is set to "0," it indicates that the DPR is used for the terminal device with a power class of 23 dBm, and if the PH type field is set to "1," it indicates that the DPR is used for the terminal device with a power class of 33 dBm, or vice versa. This is not limited in the embodiments of this application. Specifically, the PHT may occupy one bit, two bits, or another quantity of bits. PH is power headroom, and is used for indicating a class of the reported power headroom. DV is data volume, and indicates a total volume of available data of all logical channels after all MAC PDUs of this TTI are constructed, and a data volume that has not been associated with the logical channels. The data volume is in bytes, and includes all data that can be used for transmission of an RLC layer, a PDCP layer, and an RRC layer. When a buffer size is calculated, sizes of an RLC header and a MAC header do not count. A length of the field is four bits. See Table 12 for values of the field of the buffer size.

TABLE 12

| Index value | Data volume value (DV) [byte] |
|---|---|
| 0 | DV = 0 |
| 1 | 0 < DV ≤ 10 |
| 2 | 10 < DV ≤ 14 |
| 3 | 14 < DV ≤ 19 |
| 4 | 19 < DV ≤ 26 |
| 5 | 26 < DV ≤ 36 |
| 6 | 36 < DV ≤ 49 |
| 7 | 49 < DV ≤ 67 |
| 8 | 67 < DV ≤ 91 |
| 9 | 91 < DV ≤ 125 |
| 10 | 125 < DV ≤ 171 |
| 11 | 171 < DV ≤ 234 |
| 12 | 234 < DV ≤ 321 |
| 13 | 321 < DV ≤ 768 |
| 14 | 768 < DV ≤ 1500 |
| 15 | DV > 1500 |

Table 13 shows a correspondence between PH and power headroom classes.

TABLE 13

| Power headroom (PH) | Power headroom class |
|---|---|
| 0 | POWER_HEADROOM_0 |
| 1 | POWER_HEADROOM_1 |
| 2 | POWER_HEADROOM_2 |
| 3 | POWER_HEADROOM_3 |

For the third manner, the terminal device may indicate the type of the reported DPR by using a reserved logical channel identity (LCID). Table 14 shows LCID values of a UL-SCH. For example, if LCID=01011 it is identified that PH in the reported DPR corresponds to the terminal device with a power class of 33 dBm or if LCID=101011, it indicates that the terminal device supports the power class of 33 dBm. Alternatively, other reserved LCID index values in the following table may be used for indicating whether the terminal device supports the power class of 33 dBm, or indicating a new power class corresponding to the reported DPR.

TABLE 14

| Index | LCID values |
|---|---|
| 00000 | CCCH |
| 00001- | Identity of the |

TABLE 14-continued

| Index | LCID values |
|---|---|
| 01010 | logical channel |
| 01011 | Reserved |
| 01100 | Reserved |
| 01101-10100 | Reserved |
| 10101 | Reserved |
| 10110 | Reserved |
| 10111 | Reserved |
| 11000 | Reserved |
| 11001 | Reserved |
| 11010 | PHR |
| 11011 | C-RNTI |
| 11100 | Reserved |
| 11101 | Short BSR |
| 11110 | Reserved |
| 11111 | Padding |

Figure 11:
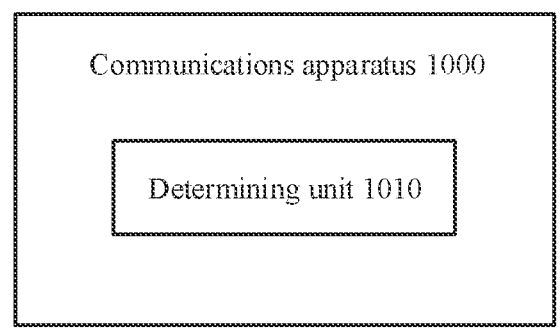
FIG. 11 is a schematic block diagram of a communications apparatus according to an embodiment of this application.
Figure 12:
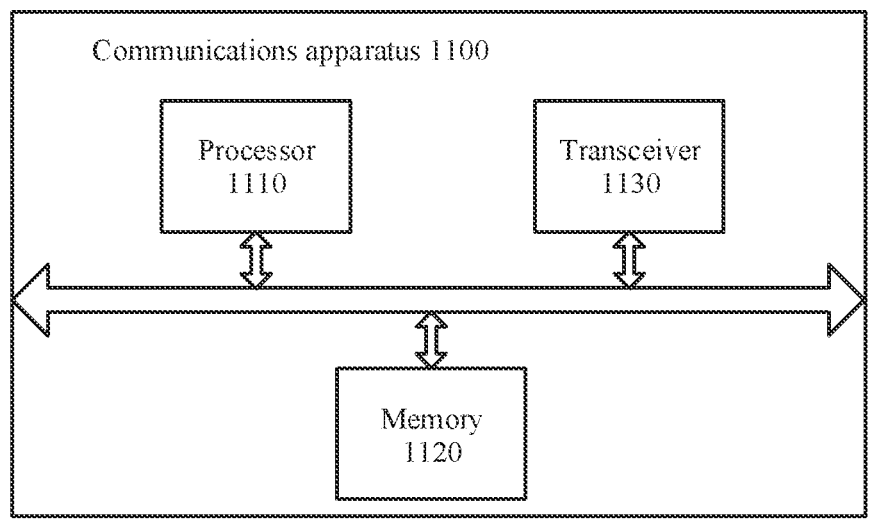
FIG. 12 is a schematic block diagram of another communications apparatus according to an embodiment of this application.

The communication methods provided in the embodiments of this application are described in detail above with reference to FIG. 1 to FIG. 10, and the following describes in detail communications apparatuses provided in the embodiments of this application with reference to FIG. 11 and FIG. 12.

FIG. 11 is a schematic block diagram of a communications apparatus 1000 according to an embodiment of this application. The apparatus 1000 may be specifically a terminal device. The apparatus 1000 includes a determining unit 1010.

In an embodiment, the apparatus 1000 is configured to perform cell selection.

Specifically, the determining unit 1010 is configured to; when a power class of a terminal device is a first power class, determine a first offset of the first power class and a second offset of the first power class.

The determining unit 1010 is further configured to determine a compensation amount of the first power class based on the first offset and the second offset.

The determining unit 1010 is further configured to determine, based on the second offset and the compensation amount of the first power class, whether to camp on a first cell.

Optionally, the determining unit 1010 is specifically configured to determine the compensation amount of the first power class based on the following formula (1):

$$P_{compensation} = \max(P_{EMAX} - \min(P_{EMAX} + P_{offset}, P_{powerclass}) - Q_{offsettemp}, 0)(dB) \quad (1), \text{where}$$

$P_{compensation}$ in the formula (1) represents the compensation amount of the first power class, $P_{EMAX}$ is a maximum transmit power of the terminal device allowed by the first cell, $P_{offset}$ represents the first offset, $Q_{offsettemp}$ represents the second offset, and $P_{powerclass}$ is a maximum radio frequency output power that corresponds to the first power class and that is of the terminal device.

Optionally, the determining unit 1010 is further configured to: when the power class of the terminal device is a second power class, determine a compensation amount of the second power class.

The determining unit 1010 is further configured to determine, based on the compensation amount of the second power class, whether to camp on the first cell.

Optionally, the determining unit 1010 is specifically configured to determine the compensation amount $P_{compensation}$ of the second power class based on the following formula (2):

$$P_{compensation} = \max(P_{EMAX} - P_{powerclass}, 0)(dB) \quad (2), \text{where}$$

$P_{compensation}$ in the formula (2) represents the compensation amount of the second power class. $P_{EMAX}$ is the maximum transmit power of the terminal device allowed by the first cell, and $P_{powerclass}$ is a maximum radio frequency output power that corresponds to the second power class and that is of the terminal device.

Optionally, the communications unit 1000 further includes a transceiver unit, configured to receive a system message, where the system message includes the first offset and the second offset.

Optionally, the first power class is a power class of 33 dBm. The second power class is a power class of 23 dBm.

Optionally, a value of the first offset is 0 dB, 2 dB, 4 dB, 6 dB, 8 dB, 10 dB, 12 dB, or 15 dB, and a value of the second offset is −7, −6, −5, −4, −3, −2, −1, or 0.

In another embodiment, the apparatus 1000 is used for uplink power control.

The determining unit 1010 is configured to: when a terminal device determines that a power class is a first power class, determine, by the terminal device, a first offset of the first power class.

The determining unit 1010 is further configured to determine a first terminal transmit power corresponding to the first power class based on the first offset.

The determining unit 1010 is further configured to determine a terminal uplink transmit power corresponding to the first power class based on the first terminal transmit power.

Optionally, the determining unit 1010 is specifically configured to determine the first terminal transmit power based on the following formula (3):

$$P_{CMAX,c} = \text{Min}(P_{max} + P_{offset}, P_{powerclass}) \quad (3),\text{ where}$$

$P_{CMAX,c}$ in the formula (3) represents the first terminal transmit power, $P_{max}$ is a maximum transmit power of the terminal device allowed by a serving cell, $P_{offset}$ represents the first offset, and $P_{powerclass}$ is a maximum radio frequency output power that corresponds to the first power class and that is of the terminal device.

Optionally, the determining unit 1010 is further configured to: when the terminal device determines that the power class is a second power class, determine a second terminal transmit power corresponding to the second power class.

The determining unit 1010 is further configured to determine a terminal uplink transmit power corresponding to the second power class based on the second terminal transmit power.

Optionally, the determining unit 1010 is specifically configured to determine the second terminal transmit power based on the following formula (4):

$$P_{CMAX,c} = \text{Min}(P_{max}, P_{powerclass}) \quad (4),\text{ where}$$

$P_{CMAX,c}$ in the formula (4) represents the second terminal transmit power, $P_{max}$ is the maximum transmit power of the terminal device allowed by the serving cell, and $P_{powerclass}$ is a maximum output power that corresponds to the second power class and that is of the terminal device.

Optionally, the apparatus 1000 further includes a transceiver unit, configured to receive a system message, where the system message includes the first offset.

Optionally, the first power class is a power class of 33 dBm. The second power class is a power class of 23 dBm.

Optionally, a value of the first offset is 0 dB, 2 dB, 4 dB, 6 dB, 8 dB, 10 dB, 12 dB, or 15 dB.

In another embodiment, the apparatus 1000 is used for random access.

The determining unit 1010 is configured to: when a power class of a terminal device is a first power class, determine a first offset of the first power class.

The determining unit 1010 is further configured to determine a preamble initial target received power and/or ramping step corresponding to the first power class based on the first offset.

The determining unit 1010 is further configured to perform random access based on the preamble initial target received power and/or ramping step corresponding to the first power class.

Optionally, the determining unit 1010 is specifically configured to: add the first offset to an initialized preamble initial target received power, to obtain the preamble initial target received power corresponding to the first power class; and/or
add the first offset to an initialized ramping step, to obtain the ramping step corresponding to the first power class.

Optionally, the apparatus 1000 further includes a transceiver unit, configured to receive, by the terminal device, a system message, where the system message includes the first offset.

Optionally, the first power class is a power class of 33 dBm. The second power class is a power class of 23 dBm.

Optionally, a value of the first offset is 0 dB, 2 dB, 4 dB, 6 dB, 8 dB, 10 dB, 12 dB, or 15 dB.

It should be noted that, in this embodiment of the present disclosure, the determining unit 1010 may be implemented by a processor, and the transceiver unit may be implemented by a transceiver. As shown in FIG. 12, the communications apparatus 1100 may include a processor 1110, a memory 1120, and a transceiver 1130. The memory 1120 may be configured to store code executed by the processor 1110, or the like, and the processor 1110 may be configured to process data or programs.

In an implementation process, the steps in the foregoing methods can be implemented by using a hardware integrated logical circuit in the processor 1110, or by using instructions in a form of software. The steps of the method disclosed with reference to the embodiments of the present invention may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 1120, and the processor 1110 reads information in the memory 1120 and completes the steps in the foregoing methods in combination with hardware of the processor. To avoid repetition, details are not described herein again.

The communications apparatus 1000 shown in FIG. 11 or the communications apparatus 1100 shown in FIG. 12 can implement the processes of the terminal device corresponding to FIG. 2, FIG. 4, and FIG. 8 in the foregoing method embodiments. Specifically, refer to the descriptions in the foregoing for the communications apparatus 1000 or the communications apparatus 1100. To avoid repetition, details are not described herein again.

The embodiments of this application further provide a computer-readable medium, configured to store computer programs. The computer programs include instructions used for performing the corresponding methods of the terminal device in the foregoing method embodiments.

The embodiments of this application further provide a computer program product, including computer program code. When run by a communications unit, a processing unit, a transceiver, or a processor of a communications device (for example, a terminal device or a network device), the computer program code enables the communications device to perform the corresponding method of the terminal device in any one the foregoing method embodiments.

The embodiments in this application may be used independently, or may be used jointly. This is not limited herein.

It should be understood that the processor in the embodiments of the present invention may be a central processing unit (CPU), may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor or any regular processor or the like.

It should be further understood that the memory mentioned in the embodiments of the present invention may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM).

It should be noted that, when the processor is a general-purpose processor, a DSP, an ASIC, an FPGA or another programmable logic device, a discrete gate or a transistor logic device, or a discrete hardware component, the memory (storage module) is integrated into the processor.

It should be noted that the memory described herein is intended to include, but is not limited to, these and any other suitable type of memory.

It should be further understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementations. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to a current technology, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, wherein the method is used for cell selection, and the method comprises:
when a power class of a terminal device is a first power class, determining, by the terminal device, a first offset of the first power class and a second offset of the first power class;
determining, by the terminal device and based on the second offset and a smaller value between (1) a sum of the first offset and a maximum transmit power of the terminal device allowed by a first cell and (2) a maximum radio frequency output power that corresponds to the first power class and that is of the terminal device, a compensation amount of the first power class; and determining, by the terminal device and based on the second offset and the compensation amount of the first power class, whether to camp on the first cell.

2. The method according to claim 1, wherein the determining, by the terminal device and based on the second offset and a smaller value between (1) a sum of the first offset and a maximum transmit power of the terminal device allowed by a first cell and (2) a maximum radio frequency output power that corresponds to the first power class and that is of the terminal device, a compensation amount of the first power class comprises:

determining, by the terminal device, the compensation amount of the first power class based on the following formula (1):

$$P_{compensation} = \text{Max}(P_{EMAX} - \min(P_{EMAX} + P_{offset}, P_{powerclass}) - Q_{offsettemp}, 0)(\text{dB}) \quad (1), \text{ wherein:}$$

$P_{compensation}$ in the formula (1) represents the compensation amount of the first power class, $P_{EMAX}$ is the maximum transmit power of the terminal device allowed by the first cell, $P_{offset}$ represents the first offset, $Q_{offsettemp}$ represents the second offset, and $P_{powerclass}$ is the maximum radio frequency output power that corresponds to the first power class and that is of the terminal device.

3. The method according to claim 1, further comprising:
when the power class of the terminal device is a second power class, determining, by the terminal device, a compensation amount of the second power class; and
determining, by the terminal device and based on the compensation amount of the second power class, whether to camp on the first cell.

4. The method according to claim 3, wherein the determining, by the terminal device, a compensation amount of the second power class comprises:

determining, by the terminal device, the compensation amount of the second power class based on the following formula (2):

$$P_{compensation} = \max(P_{EMAX} - P_{powerclass}, 0)(\text{dB}) \quad (2), \text{ wherein:}$$

$P_{compensation}$ in the formula (2) represents the compensation amount of the second power class, $P_{EMAX}$ is the maximum transmit power of the terminal device allowed by the first cell, and $P_{powerclass}$ is a maximum radio frequency output power that corresponds to the second power class and that is of the terminal device.

5. The method according to claim 1, wherein the determining, by the terminal device, a first offset of the first power class and a second offset of the first power class comprises:

receiving, by the terminal device, a system message, wherein the system message comprises the first offset and the second offset.

6. The method according to claim 1, wherein a value of the first offset is 0 dB, 2 dB, 4 dB, 6 dB, 8 dB, 10 dB, 12 dB, or 15 dB, and a value of the second offset is −7, −6, −5, −4, −3, −2, −1, or 0.

7. The method according to claim 1, wherein the first power class is a power class of 33 dBm.

8. A communication method, wherein the method is used for uplink power control, and the method comprises:
when a terminal device determines that a power class is a first power class, determining, by the terminal device, a first offset of the first power class;
determining, by the terminal device and based on a smaller value between (1) a sum of the first offset and a maximum transmit power of the terminal device allowed by a serving cell and (2) a maximum radio frequency output power that corresponds to the first power class and that is of the terminal device, a first terminal transmit power corresponding to the first power class; and
determining, by the terminal device and based on the first terminal transmit power, a terminal uplink transmit power corresponding to the first power class.

9. The method according to claim 8, wherein the determining, by the terminal device and based on a smaller value between (1) a sum of the first offset and a maximum transmit power of the terminal device allowed by a serving cell and (2) a maximum radio frequency output power that corresponds to the first power class and that is of the terminal device, a first terminal transmit power corresponding to the first power class comprises:

determining, by the terminal device and based on the smaller value between (1) the sum of the first offset and the maximum transmit power of the terminal device allowed by the serving cell and (2) the maximum radio frequency output power that corresponds to the first power class and that is of the terminal device, the first terminal transmit power based on the following formula (3):

$$P_{CMAX,c} = \text{Min}(P_{max} + P_{offset}, P_{powerclass}) \quad (3), \text{ wherein:}$$

$P_{CMAX,c}$ in the formula (3) represents the first terminal transmit power, $P_{max}$ is the maximum transmit power of the terminal device allowed by the serving cell, $P_{offset}$ represents the first offset, and $P_{powerclass}$ is the maximum radio frequency output power that corresponds to the first power class and that is of the terminal device.

10. The method according to claim 9, further comprising:
when the terminal device determines that the power class is a second power class, determining, by the terminal device, a second terminal transmit power corresponding to the second power class; and
determining, by the terminal device and based on the second terminal transmit power, a terminal uplink transmit power corresponding to the second power class.

11. The method according to claim 10, wherein the determining, by the terminal device, a second terminal transmit power corresponding to the second power class comprises:

determining, by the terminal device, the second terminal transmit power based on the following formula (4):

$$P_{CMAX,c} = \text{Min}(P_{max}, P_{powerclass}) \quad (4), \text{ wherein:}$$

$P_{CMAX,c}$ in the formula (4) represents the second terminal transmit power, $P_{max}$ is the maximum transmit power of the terminal device allowed by the serving cell, and $P_{powerclass}$ is a maximum output power that corresponds to the second power class and that is of the terminal device.

12. The method according to claim 8, wherein the determining, by the terminal device, a first offset of the first power class comprises:

receiving, by the terminal device, a system message, wherein the system message comprises the first offset.

13. The method according to claim 8, wherein a value of the first offset is 0 dB, 2 dB, 4 dB, 6 dB, 8 dB, 10 dB, 12 dB, or 15 dB.

14. A communication method, wherein the method is used for random access, and the method comprises:
  when a power class of a terminal device is a first power class, determining, by the terminal device, a first offset of the first power class;
  determining, by the terminal device and based on a sum of the first offset and an initialized preamble initial target received power or a sum of the first offset and an initialized ramping step, at least one of a preamble initial target received power or a ramping step corresponding to the first power class; and
  performing, by the terminal device, random access based on the at least one of the preamble initial target received power or the ramping step corresponding to the first power class.

15. The method according to claim 14, wherein
  the determining, by the terminal device and based on a sum of the first offset and an initialized preamble initial target received power or a sum of the first offset and an initialized ramping step, at least one of the preamble initial target received power or a ramping step corresponding to the first power class comprises at least one of the following:
    adding, by the terminal device, the first offset to the initialized preamble initial target received power, to obtain the preamble initial target received power corresponding to the first power class; or
    adding, by the terminal device, the first offset to the initialized ramping step, to obtain the ramping step corresponding to the first power class.

* * * * *

UNITED STATES PATENT AND TRADEMARK OFFICE
CERTIFICATE OF CORRECTION

| | | |
|---|---|---|
| PATENT NO. | : 11,902,915 B2 | Page 1 of 1 |
| APPLICATION NO. | : 17/360276 | |
| DATED | : February 13, 2024 | |
| INVENTOR(S) | : Haifeng Yu et al. | |

It is certified that error appears in the above-identified patent and that said Letters Patent is hereby corrected as shown below:

In the Claims

Column 41, Line 15 (Approx.), Claim 2, please delete "=Max($P_{EMAX}$" and insert therefore -- =max($P_{EMAX}$ --.

Signed and Sealed this
Seventh Day of May, 2024

*Katherine Kelly Vidal*

Katherine Kelly Vidal
*Director of the United States Patent and Trademark Office*